US012227383B2

(12) United States Patent
Sakakibara et al.

(10) Patent No.: US 12,227,383 B2
(45) Date of Patent: Feb. 18, 2025

(54) SHEET PROCESSING APPARATUS AND IMAGE FORMING SYSTEM INCORPORATING THE SHEET PROCESSING APPARATUS

(71) Applicants: Keita Sakakibara, Kanagawa (JP); Yuji Miyachi, Kanagawa (JP); Tsubasa Hashimoto, Kanagawa (JP)

(72) Inventors: Keita Sakakibara, Kanagawa (JP); Yuji Miyachi, Kanagawa (JP); Tsubasa Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 82 days.

(21) Appl. No.: 18/347,728

(22) Filed: Jul. 6, 2023

(65) Prior Publication Data

US 2024/0017956 A1 Jan. 18, 2024

(30) Foreign Application Priority Data

Jul. 12, 2022 (JP) ................................ 2022-111799

(51) Int. Cl.

*B65H 37/04* (2006.01)
*B31F 5/00* (2006.01)
*B31F 5/02* (2006.01)
*B65H 31/40* (2006.01)

(52) U.S. Cl.

CPC ............. *B65H 37/04* (2013.01); *B31F 5/001* (2013.01); *B31F 5/02* (2013.01); *B65H 31/40* (2013.01); *B65H 2404/14* (2013.01); *B65H 2801/27* (2013.01)

(58) Field of Classification Search

CPC . B31F 5/001; B31F 5/02; B65H 37/04; B65H 31/34; B65H 31/309; B65H 31/3081; B65H 2404/14; B65H 2301/51616; B65H 2301/43828; G03G 15/6544; G03G 2215/00827; G03G 2215/00852

USPC ........................................... 270/58.08, 58.09

See application file for complete search history.

(56) References Cited

U.S. PATENT DOCUMENTS 8,246,033 B2 * 8/2012 Sato .......................... B42C 1/12 270/58.08
10,093,511 B2 * 10/2018 Okada .................... B65H 37/04
10,131,107 B2 * 11/2018 Shimizu ................ B65H 37/04
10,987,964 B2 * 4/2021 Noguchi .................. B42C 1/12

(Continued)

FOREIGN PATENT DOCUMENTS

JP 2016-026971 2/2016
JP 2016-126658 7/2016

*Primary Examiner* — Leslie A Nicholson, III

(74) *Attorney, Agent, or Firm* — IPUSA, PLLC

(57) ABSTRACT

A sheet processing apparatus includes a tray, a first binder, a second binder, a feeder, and circuitry. The tray receives and stores a sheet bundle. The first binder presses the sheet bundle to bind the sheet bundle. The second binder penetrates the sheet bundle with a needle to bind the sheet bundle. The feeder feeds the sheet bundle in a first direction, and moves the sheet bundle in a second direction. The circuitry causes the feeder to move the sheet bundle on the tray in the second direction, moves the first binder from a binding position to a home position different from the binding position, and moves the second binder to the binding position in the width direction to bind the sheet bundle by the second binder after the sheet bundle is moved in the second direction and the first binder is moved to the home position.

11 Claims, 17 Drawing Sheets

(56) References Cited

U.S. PATENT DOCUMENTS

| | | | | |
|---|---|---|---|---|
| 11,097,919 | B2 * | 8/2021 | Matsumoto | B31F 5/02 |
| 11,130,308 | B2 * | 9/2021 | Suzuki | B65H 37/04 |
| 11,465,873 | B2 * | 10/2022 | Tanoue | G03G 15/6544 |
| 2014/0138217 | A1 | 5/2014 | Hashimoto | |
| 2020/0231401 | A1 | 7/2020 | Fukuhara et al. | |

* cited by examiner

COMPARATIVE EXAMPLE

COMPARATIVE EXAMPLE

COMPARATIVE EXAMPLE

COMPARATIVE EXAMPLE

FIG. 18

| | FIRST SENSOR | SECOND SENSORS | SHEET POSITON IN TRAY |
|---|---|---|---|
| CASE 1 | ON | ON | SHEETS CONVEYED TO REFERENCE FENCES |
| CASE 2 | OFF | ON | SHEETS BEING CONVEYED IN SHEET EJECTION DIRECTION |
| CASE 3 | OFF | OFF | CONVEYANCE OF SHEETS IN SHEET EJECTION DIRECTION COMPLETED |

SHEET PROCESSING APPARATUS AND IMAGE FORMING SYSTEM INCORPORATING THE SHEET PROCESSING APPARATUS

CROSS-REFERENCE TO RELATED APPLICATION

This patent application is based on and claims priority pursuant to 35 U.S.C. § 119(a) to Japanese Patent Application No. 2022-111799, filed on Jul. 12, 2022, in the Japan Patent Office, the entire disclosure of which is hereby incorporated by reference herein.

BACKGROUND

Technical Field

Embodiments of the present disclosure relate to a sheet processing apparatus and an image forming system incorporating the sheet processing apparatus.

Background Art

Various types of sheet processing apparatuses in the art are known that bind a sheet bundle of overlaid sheet media. Known binding operations applied to such sheet processing apparatuses include a stapling operation in which a sheet bundle is bound using needle-shaped members (binding members) to penetrate through the sheet bundle and a crimping operation in which pressure is applied to a part of a sheet bundle to deform the sheet bundle to be bound without using a binding member.

A sheet processing apparatus in the art capable of selectively operating the stapling operation and the crimping operation discloses a technique in which, for example, the non-stapling operation is changed to the stapling operation in order to perform a binding operation according to a user's purpose.

SUMMARY

Embodiments of the present disclosure described herein provide a novel sheet processing apparatus including a tray, a first binder, a second binder, a feeder, and circuitry. The tray receives and stores multiple sheet media as a sheet bundle. The first binder presses the sheet bundle to bind the sheet bundle at a binding position. The second binder penetrates the sheet bundle with a needle to bind the sheet bundle at the binding position. The feeder feeds the sheet bundle in a first direction toward the first binder and the second binder, and moves the sheet bundle in a second direction opposite to the first direction. The circuitry is to cause the feeder to move the sheet bundle on the tray in the second direction, move the first binder from the binding position to a home position different from the binding position in a width direction orthogonal to the first direction and the second direction, and move the second binder to the binding position in the width direction to bind the sheet bundle by the second binder after the sheet bundle is moved in the second direction and the first binder is moved to the home position.

Further, embodiments of the present disclosure described herein provide an image forming system including the above-described sheet processing apparatus, and an image forming apparatus to form an image on each medium of the multiple sheet media. The above-described sheet processing apparatus binds the sheet bundle on which the image is formed by the image forming apparatus.

BRIEF DESCRIPTION OF THE SEVERAL VIEWS OF THE DRAWINGS

Exemplary embodiments of this disclosure will be described in detail based on the following figures, wherein:

FIG. 18 is a table of determination conditions in the second example of the binder of FIG. 17.

Figure 1:
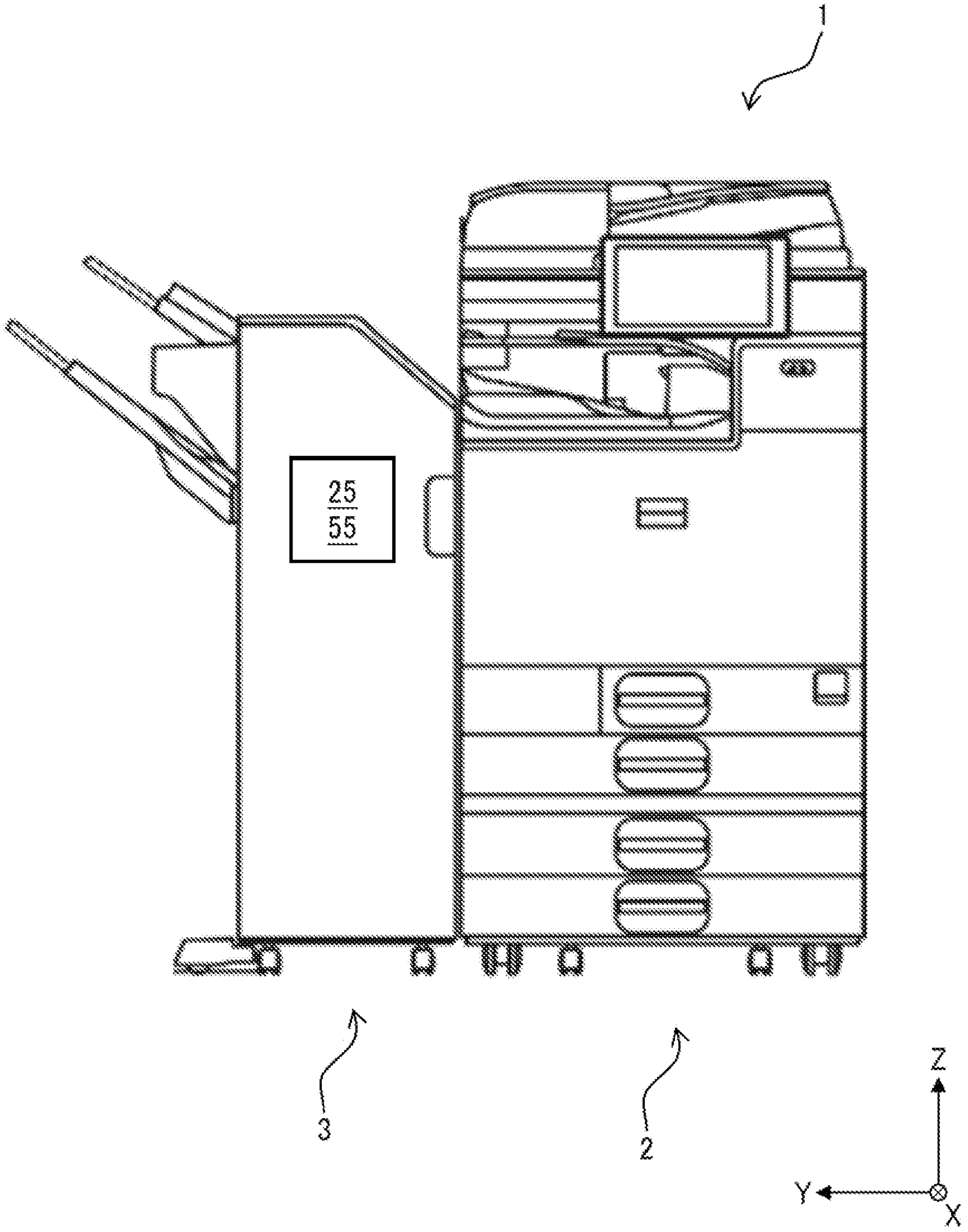
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

A description is given of an image forming apparatus according to an embodiment of the present disclosure.

Hereinafter, embodiments of the present disclosure are described with reference to the drawings.

FIG. 1 is a diagram illustrating an overall configuration of a printer system 1 serving as an image forming system according to an embodiment of the present disclosure.

The printer system 1 has a function of forming an image on a sheet P as an example of a sheet medium and performing a post-processing operation on the sheet on which the image is formed. As illustrated in FIG. 1, the printer system 1 includes an image forming apparatus 2 and a post-processing apparatus 3 serving as a sheet processing apparatus and is configured to operate the image forming apparatus 2 and the post-processing apparatus 3 in cooperation with each other. The image forming apparatus 2 may include the whole functional configuration of the post-processing apparatus 3.

The image forming apparatus 2 performs an image forming operation in which an image is formed on a sheet P and a medium ejecting operation in which the sheet P having the image is ejected to the post-processing apparatus 3. The image forming apparatus 2 includes a sheet tray that holds a sheet (sheets) P, a conveyor that picks the sheet P from the sheet tray to convey the sheet P, and an image forming device that forms an image on the sheet P conveyed by the conveyor.

The image forming device may be an inkjet image forming device in which an image is formed with ink or an electrophotographic image forming device in which an image is formed with toner. As the image forming apparatus 2 has a typical configuration, a detailed description of the configuration and functions of the image forming apparatus 2 are omitted.

Inner Configuration of Post-Processing Apparatus 3

Figure 2:
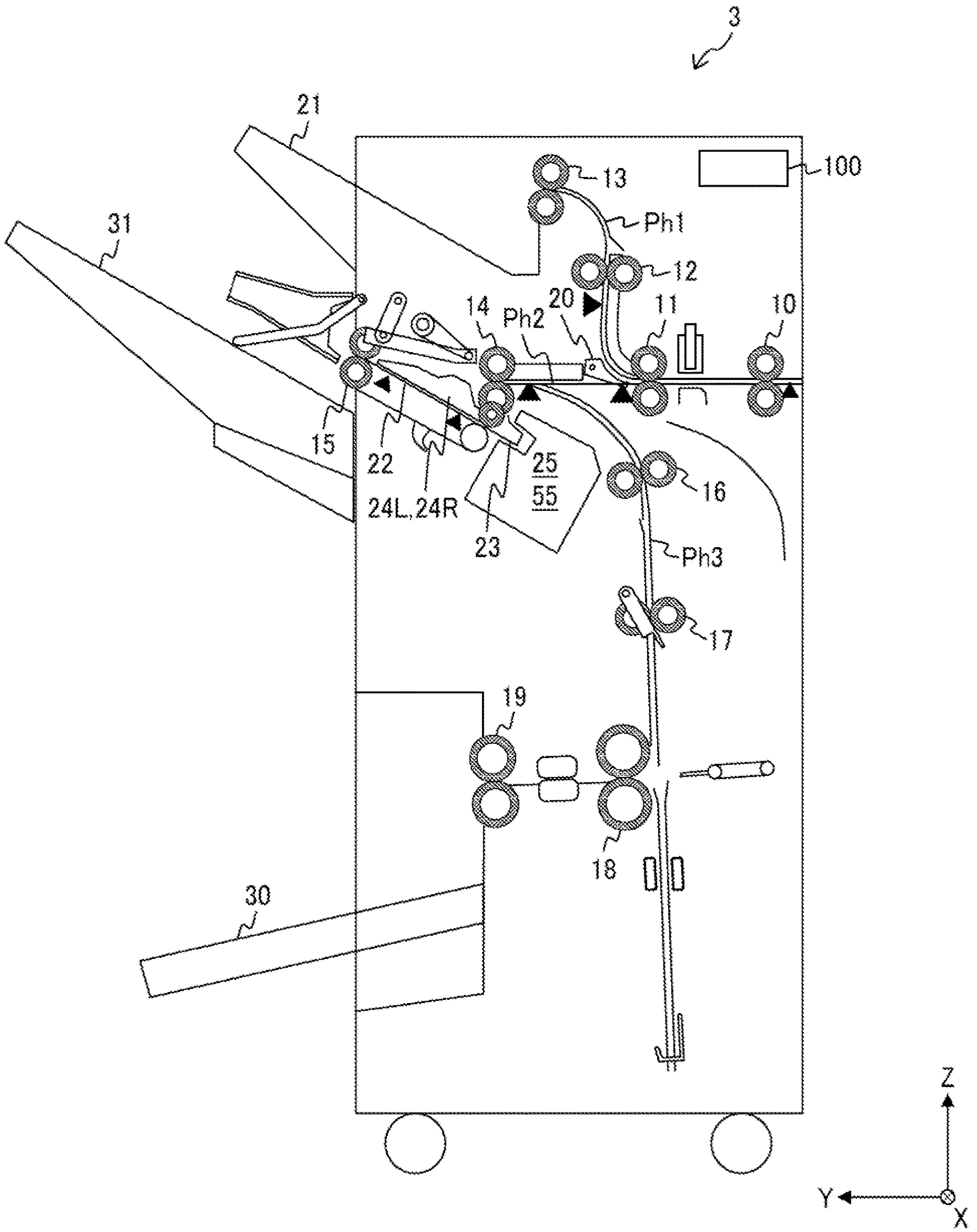
FIG. 2 is a diagram illustrating an inner configuration of a post-processing apparatus as a sheet processing apparatus according to an embodiment of the present disclosure.

FIG. 2 is a diagram illustrating an internal configuration of the post-processing apparatus 3 included in the image forming system 1 of FIG. 1.

The post-processing apparatus 3 performs a given post-processing operation on the sheet P on which the image is formed by the image forming apparatus 2. The post-processing operation performed by the post-processing apparatus 3 according to the present embodiment corresponds to a "binding operation" in which a bundle of sheets (referred to a "sheet bundle") overlaying multiple sheets P having images by a given number of sheets P having the image to fix into one bundle. As described below, the binding operations that are operable in the post-processing apparatus 3 according to the present embodiment include a "crimping operation" as a first binding operation to bind the sheet bundle by pressing a part of the sheet bundle to deform the sheet bundle and a "stapling operation" as a second binding operation to bind the sheet bundle by penetrating a part of the sheet bundle by a binding needle as a binding member. The binding operations that are operable in the post-processing apparatus 3 further include an edge stitching process for binding the edge of the sheet bundle and a saddle stitching process for binding the center of the sheet bundle.

The post-processing apparatus 3 includes conveyance roller pairs 10 to 19 each serving as a post-processing conveyor, and a switching claw 20 serving as a branch switcher that selectively switches a sheet conveyance direction in the post-processing conveyor. The conveyance roller pairs 10 to 19 convey, inside the post-processing apparatus 3, the sheet P supplied from the image forming apparatus 2. Specifically, the conveyance roller pairs 10, 11, 12, and 13 convey the sheet P along a first conveyance passage Ph1. The conveyance roller pairs 14 and 15 convey the sheet P along a second conveyance passage Ph2. The conveyance roller pairs 16, 17, 18, and 19 convey the sheet P along a third conveyance passage Ph3.

The conveyance roller pair 15 includes a drive roller 151 and a driven roller 152, which will be described below. The conveyance roller pair 15 also has a function of holding the sheets P stacked in the inner sheet tray 22 by a nip region formed by the drive roller 151 and the driven roller 152. The conveyance roller pair 15 also operates when conveying the sheet P to the inner sheet tray 22 or when ejecting the sheet bundle from the inner sheet tray 22.

The first conveyance passage Ph1 is a passage that extends to a sheet ejection tray 21 from a sheet supplying port through which the sheet P is supplied from the image forming apparatus 2. The second conveyance passage Ph2 is a passage that branches off from the first conveyance passage Ph1 between the conveyance roller pairs 11 and 14 in the sheet conveyance direction and reaches a sheet and sheet bundle ejection tray 31 via the inner sheet tray 22. The third conveyance passage Ph3 is a passage that branches off from the first conveyance passage Ph1 between the conveyance roller pairs 11 and 14 in the sheet conveyance direction and reaches to a sheet ejection tray 30.

The switching claw 20 is disposed at a branching position at which the first conveyance passage Ph1 and the second conveyance passage Ph2 branch off.

The switching claw 20 can be switched between a first position and a second position. The switching claw 20 at the first position ejects the sheet P to the sheet ejection tray 21 through the first conveyance passage Ph1. The switching claw 20 at the second position guides the sheet P conveyed in the first conveyance passage Ph1 to the second conveyance passage Ph2. When the trailing end of the sheet P that has come in the second conveyance passage Ph2 passes between the rollers of the conveyance roller pair 11, the conveyance roller pair 14 is rotated in the reverse direction to guide the sheet P to the third conveyance passage Ph3. The post-processing apparatus 3 further includes multiple sensors that detect the positions of the sheet P in the first conveyance passage Ph1, the second conveyance passage Ph2, and the third conveyance passage Ph3.

In FIG. 2, each black triangle indicates a conveyance sensor that detects the position of the sheet P during conveyance of the sheet P.

The post-processing apparatus 3 further includes the sheet ejection tray 21, the sheet ejection tray 30, and the sheet and sheet bundle ejection tray 31. The sheet ejection tray 21 supports the sheet P ejected through the first conveyance passage Ph1. Among the sheets P supplied from the image forming apparatus 2, the sheet P on which the binding operation is not performed is ejected to the sheet ejection tray 21. Among the sheets P supplied from the image forming apparatus 2, the sheet P subjected to the folding operation at the center position and the sheet bundle subjected to the saddle stitching process for stitching the center position of the sheet bundle is ejected to the sheet ejection tray 30. Among the sheets P supplied from the image forming apparatus 2, the sheet P on which the binding operation is not performed and the sheet bundle that is formed by the binding operation is ejected to the sheet and sheet bundle ejection tray 31.

In addition, the post-processing apparatus 3 includes the inner sheet tray 22 to stack the sheets P and align the ends of the sheets P for forming a state in which multiple sheets are overlaid and bound. The post-processing apparatus 3 further includes end fences 23 to regulate the position of the ends of the sheets P in the direction in which the sheets P stacked in the inner sheet tray 22 are conveyed so as to align the ends of the sheets P. The post-processing apparatus 3 further includes side fences 24 in pair of a left side fence 24L and a right side fence 24R. The side fences 24 regulate the position of the lateral ends of the sheets P stacked in the inner sheet tray 22. The lateral ends of the sheets P correspond to the ends of the sheets P in the width direction.

In addition, the post-processing apparatus 3 includes a retraction claw 26 to move the sheets P stacked in the inner sheet tray 22 in the reverse direction opposite to the direction in which the sheets P are conveyed to the inner sheet tray 22. The reverse direction is also referred to as a sheet ejection direction of the inner sheet tray 22. The end fences 23 are spaced apart from each other at a predetermined interval in the width direction of the sheet P. The retraction claw 26 is disposed between the end fences 23 in the width direction of the sheet P.

The post-processing apparatus 3 further includes a first binder 25 and a second binder 55. Each of the first binder 25 and the second binder 55 serves as a sheet processing device. The inner sheet tray 22, the end fences 23, the side fences 24, the first binder 25, and the second binder 55 perform an edge stitching process on the sheets P conveyed in the second conveyance passage Ph2.

In the following description, a direction from the conveyance roller pair 15 toward the end fences 23 is defined as a “sheet conveyance direction of the sheet (or sheets) P”. A direction orthogonal to the surface of the sheet P and to the sheet conveyance direction of the sheet (or sheets) P is defined as a “main scanning direction (the width direction of the sheet (or sheets) P)”. The sheet conveyance direction of the sheet (or sheets) P corresponds to the sub-scanning direction.

Schematic Configuration of First Binder 25 and Second Binder 55

Figure 3:
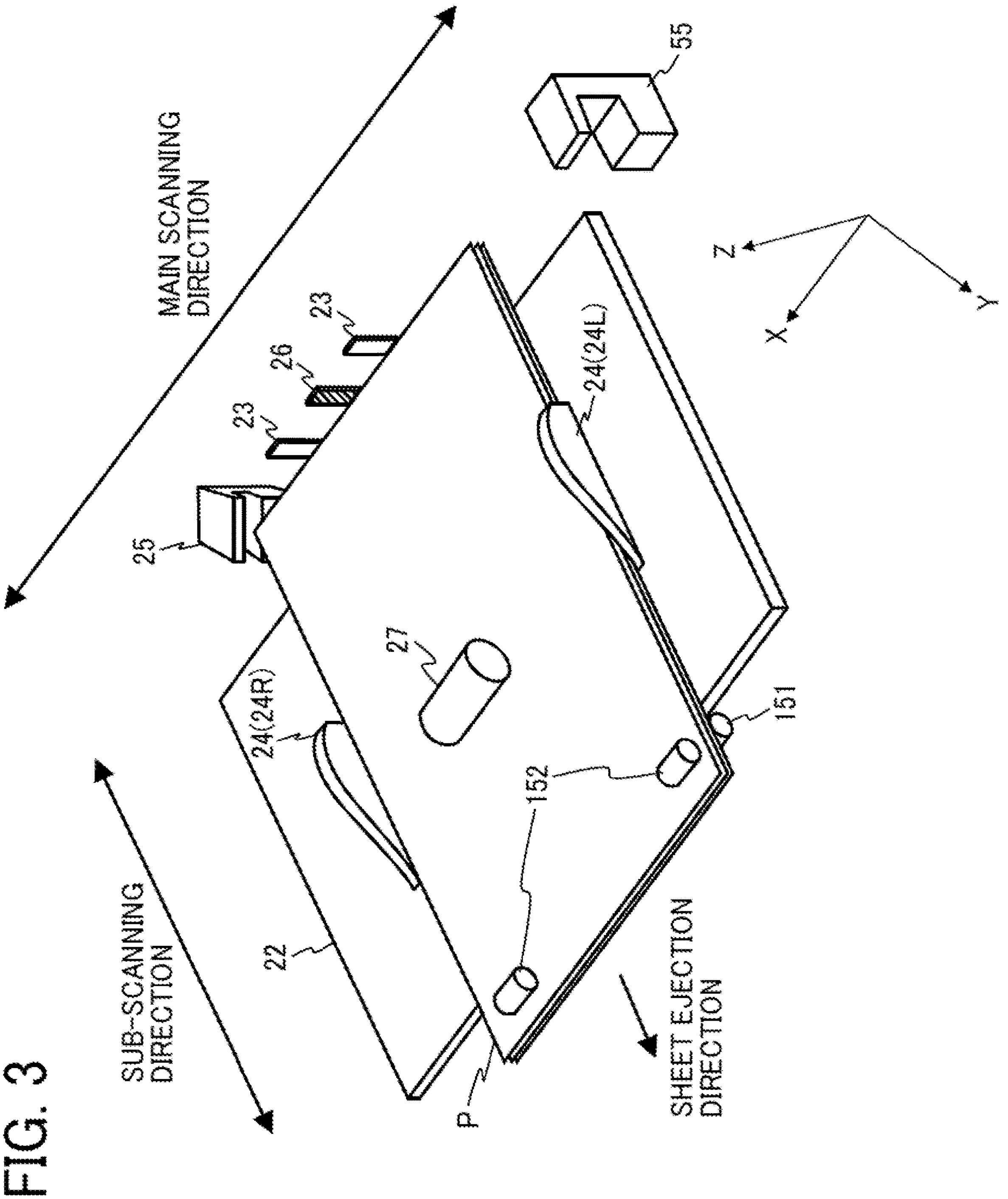
FIG. 3 is a perspective view of binders included in the post-processing apparatus of FIG. 2.

FIG. 3 is a perspective view of the first binder 25 and the second binder 55, and a configuration for performing an operation for forming a sheet bundle by the first binder 25 and the second binder 55.

As illustrated in FIG. 3, when the sheets P are conveyed to the inner sheet tray 22, the leading end of the sheets P in the sheet conveyance direction is regulated by the end fence 23 to be aligned. Then, the first binder 25 or the second binder 55 performs a binding operation at the end of the sheet bundle of the sheets P with the ends being aligned in the inner sheet tray 22. In other words, the position at which the leading end of the sheets P is regulated by the end fences 23 corresponds to the position of the sheets P when the binding operation is performed on the sheets P.

Further, the retraction claw 26 serving as a feeder is disposed in line with the end fences 23. The drive roller 151 and the driven roller 152 of the conveying roller pair 15 serve as a feeder and are disposed at the upstream portion of the inner sheet tray 22 in the sheet conveyance direction. The drive roller 151 and the driven roller 152 also have a function of nipping the sheet bundle stacked in the inner sheet tray 22 to hold the sheet bundle. In addition, a backward roller 27 serving as a feeder is disposed in contact with the surface of the uppermost sheet of the sheet bundle stacked in the inner sheet tray 22 to move the sheet bundle in the sheet conveyance direction or the reverse direction (i.e., the sheet ejection direction of the inner sheet tray 22) that is opposite to the sheet conveyance direction.

FIG. 3 illustrates the first binder 25 and the second binder 55 in the state in which a staple-less binding (crimping) is selected as the binding operation on the sheets P according to the binding operation determined by a setting in advance by a user. For this reason, when the sheets P are conveyed to the inner sheet tray 22, the second binder 55 has already been in a standby state at an initial position (home position) that is different from the binding position. In this case, the standby position of the second binder 55 is not limited to the initial position, but the initial position may be any position within a movable range when the second binder 55 performs the binding operation.

As illustrated in FIG. 3 by way of example, in a state in which “staple-less binding” (crimping) is selected as the binding operation on the sheets P by the setting in advance by a user, the first binder 25 that performs the crimping operation is at a position suitable for the binding type in accordance with the setting when the sheets P are conveyed to the inner sheet tray 22.

A description is now given of a typical inconvenience that is likely to cause damage on the sheets P when the binding operation is switched to a second binding operation (i.e., stapling operation) from the state illustrated in FIG. 3.

Figure 4:
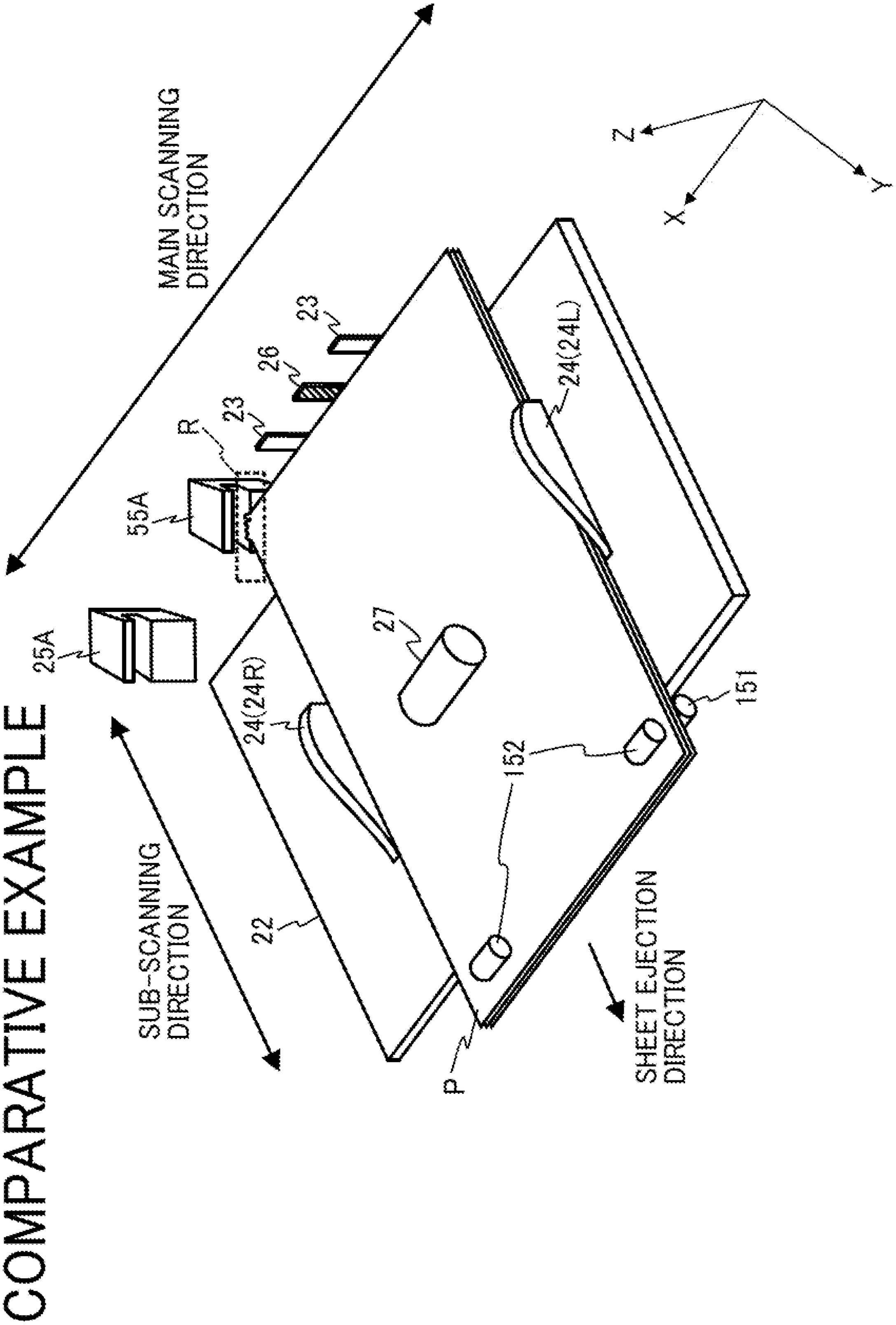
FIG. 4 is a perspective view of typical binders for explaining an inconvenience likely to occur in a changeover of the typical binders.

FIG. 4 is a perspective view of typical binders for explaining an inconvenience likely to cause damage on the sheets P in a changeover of the binding operation.

For example, the number of sheets P that can be bound through the crimping operation by the first binder 25 is smaller than the number of sheets P that can be bound through the stapling operation by the second binder 55. In this case, as illustrated in FIG. 3, if the "crimping operation" is selected (set) by the setting in advance by a user, the number of sheets P ejected and conveyed by the operation performed by the image forming apparatus 2 may later exceed the number of sheets bindable by the first binder 25 (i.e., the maximum bindable number of sheets). In this case, the crimping operation by the first binder 25 cannot be performed, and the binding operation needs to be switched to the stapling operation performed by the second binder 55.

For example, as illustrated in FIG. 4, when the binding operation is switched from a first binder 25A to a second binder 55A with the sheets P being stacked in the inner sheet tray 22, the second binder 55A is moved to the binding position at which the first binder 25A was supposed to perform the binding operation on the sheets P, so as to change the posture of the second binder 55A according to the binding position to be performed. To do so, the first binder 25A is temporarily moved from the position illustrated in FIG. 3 to the initial position. The second binder 55A is then moved to the position suitable for the binding type set by the user to be changed to the posture for the binding operation.

When the position suitable for the binding type set by the user is the position at which the direction of the second binder 55A is rotated, there is a concern that, when the second binder 55A rotates, the second binder 55A comes into contact with an end face of the sheets P stacked in the inner sheet tray 22 (i.e., a region R of a corner portion in FIG. 4). As a result, the end face of the sheets P may be damaged, for example, being folded or scratched, due to contact with the second binder 55.

In order to prevent the above-described damage to the sheets P (e.g., the end face of the sheets P is folded or scratched), the second binder 55A needs to be rotated after the second binder 55A is moved to a position far from the end face of the sheets P, that is, a position close to the initial position of the first binder 25A and away from the end face of the sheets P. Then, after the rotation of the second binder 55A is completed, the second binder 55A may be moved back to the binding position. In this case, the second binder 55A is moved back to the position suitable for the binding type set by a user. However, there stands an inconvenience to avoid damage to the sheets P as illustrated in FIG. 4.

Figure 5:
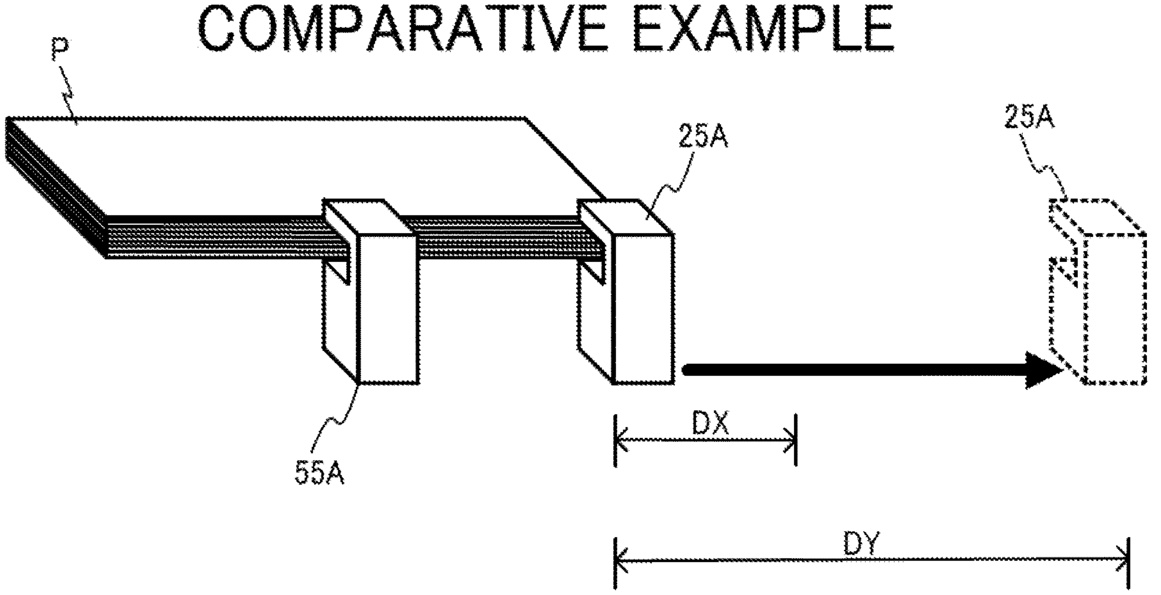
FIG. 5 is a diagram illustrating typical binders for explaining an inconvenience likely to occur in the changeover of the typical binders.
Figure 6:
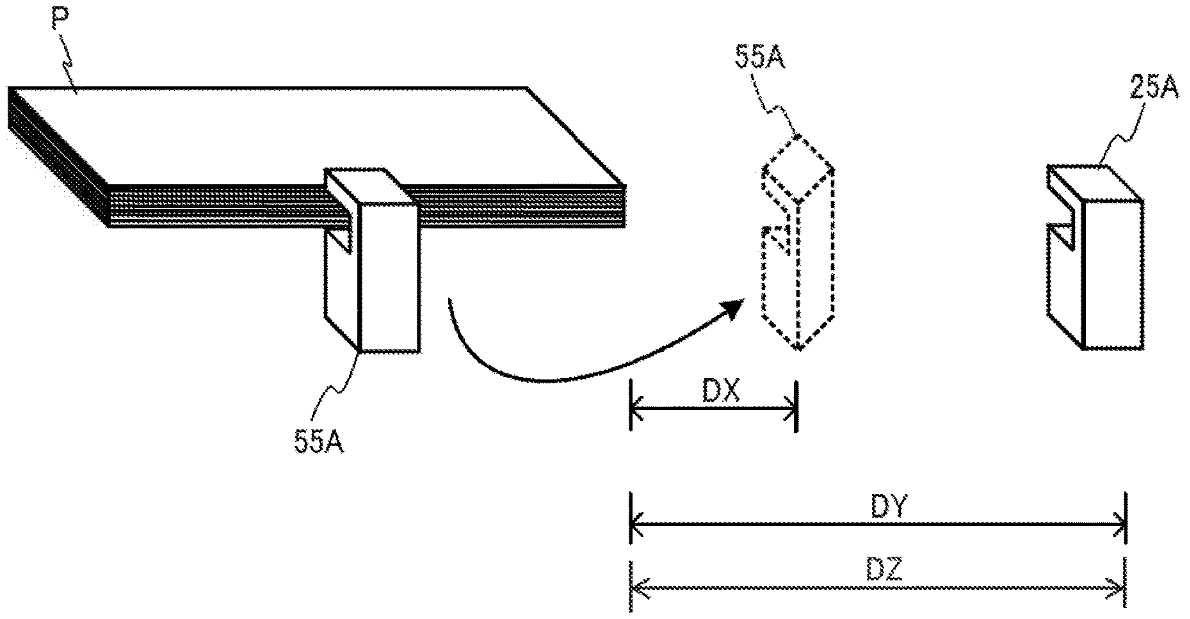
FIG. 6 is a diagram illustrating the typical binders for explaining a subsequent state of the inconvenience in the changeover of the typical binders.
Figure 7:
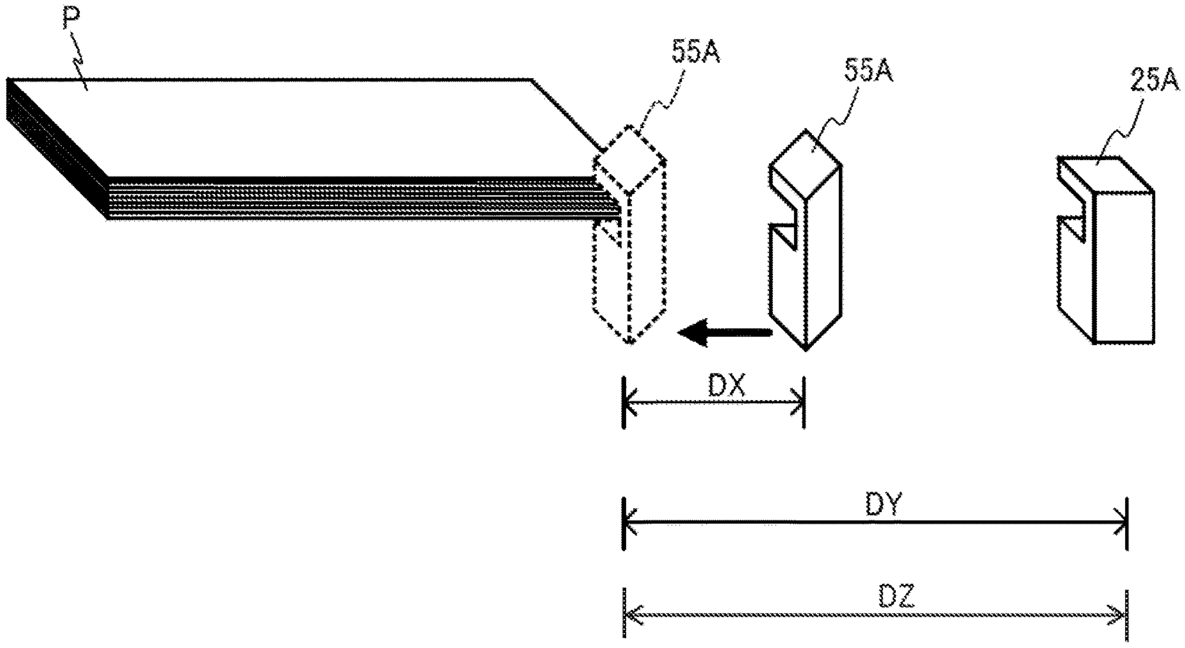
FIG. 7 is a diagram illustrating the typical binders for explaining a subsequent state of the inconvenience in the changeover of the typical binders.

FIGS. 5 to 7 are diagrams for explaining an inconvenience that occurs when the changeover of the binding operation to the second binder 55A needs to be performed at a position that is sufficiently spaced away from the ends of the sheets P and that does not interfere with the first binder 25A in a typical sheet processing apparatus.

FIG. 5 is a diagram illustrating typical binders (i.e., the first binder 25A and the second binder 55A) for explaining an inconvenience likely to occur in the changeover between the typical binders.

Specifically, FIG. 5 illustrates an initial position (home position) of the first binder in consideration of the distance of movement of the second binder 55A to move away from the end of the sheets P in order to avoid interference with the first binder 25A in the changeover to the second binder 55A.

FIG. 5 illustrates the relative positions of the first binder 25A and the second binder 55A. FIG. 5 further illustrates the relative positions of the second binder 55A and the sheets P.

In FIGS. 5 to 7, a configuration for stacking and holding the sheets P, such as the inner sheet tray 22, is omitted.

A "distance DX" in FIG. 5 indicates the distance of movement of the first binder 25A when the first binder 25A is assumed to move from the initial position to perform a binding operation on the sheets P without considering the second binder 55A.

In addition, a "distance DY" in FIG. 5 indicates the distance of movement of the first binder 25A from the initial position to the sheets P so that the second binder 55A can rotate without contacting the end of the sheets P and the first binder 25A at the initial position does not interfere with the sheets P. In other words, the distance DY indicates the distance of the first binder 25A to move for the binding operation so as not to cause damage on the sheets P when the binding operation is switched.

In other words, when the binding operation is switched from the crimping operation to the stapling operation due to an increase in the number of sheets P, the first binder 25A needs to move a longer distance in order to avoid damaging the sheets P. In the configuration illustrated in FIG. 5, the distance of movement of the first binder 25A is increased by the amount obtained by "the distance DY−the distance DX".

Further, FIG. 6 is a diagram illustrating the typical binders for explaining a subsequent state of the inconvenience in the changeover between the typical binders.

As illustrated in FIG. 6 with the subsequent state from FIG. 5, when the binding operation is switched, the first binder 25A is retracted to the initial position, then the second binder 55A is rotated to change the angle with respect to the sheets P. In this case, as illustrated in FIG. 6, in a space obtained after the first binder 25A has retracted from the end of the sheets P to the initial position that is set as the distance DY, the second binder 55A is moved to the position at which the second binder 55A does not contact the end of the sheets P when the second binder 55A is rotated.

Then, at the position of the destination, the second binder 55A is rotated so as to obtain the given angle with respect to the sheets P. This space is a position corresponding to a "distance DZ" proximate to the binding position. The distance DZ has a relation of "the distance 0< the distance DZ< the distance DY". The "distance 0" indicates the end of the sheets P.

Further, FIG. 7 is a diagram illustrating the typical binders for explaining a subsequent state of the inconvenience in the changeover between the typical binders.

As illustrated in FIG. 7 with the subsequent state from FIG. 6, when the changeover is performed to switch the first binder 25A to the second binder 55A, the second binder 55A is rotated then moved toward the sheets P, to the position suitable for the binding type set by a user. The distance of movement of the second binder 55A at this time corresponds to the above-described "distance DZ".

As described above, when the first binder 25A is switched to the second binder 55A, particularly when the sheets P are stacked in the inner sheet tray 22, the distance of movement of the first binder 25A increases. As the distance of movement of the second binder 55A increases, a larger space for the second binder 55A to rotate (i.e., the changeover) is obtained.

In other words, in performing the typical changeover of the binding operation between the first binder 25A and the second binder 55A with reference to FIGS. 5 to 7, it is difficult to complete the changeover of the binding operation without damaging the sheet P unless the distance of movement of the first binder 25A or the second binder 55A is increased. Then, an increase in the distance of movement of the second binder 55A increases the period of time until completion of the changeover, the productivity of the sheet bundle decreases. In addition, obtaining a space for an operation such as rotation of the second binder 55A leads to an increase in size of a typical sheet processing apparatus including such typical binders.

First Embodiment of Printer System 1

A description is given of the operations of the printer system 1 as an image forming system according to a first embodiment of the present disclosure.

Figure 8:
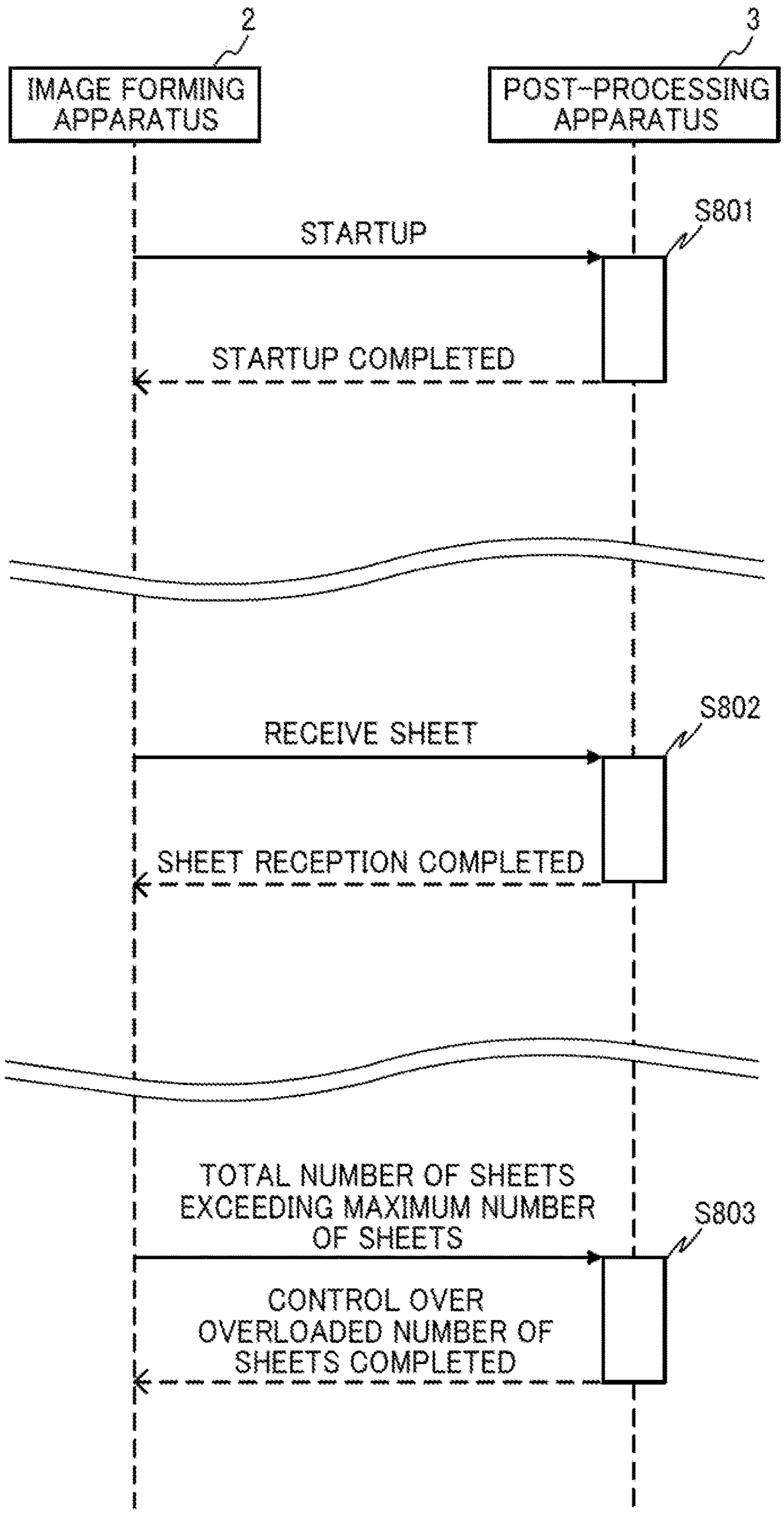
FIG. 8 is a sequence diagram illustrating control triggers executed in the image forming system of FIG. 1.

FIG. 8 is a command sequence diagram illustrating control triggers executed in the image forming apparatus 2 and the post-processing apparatus 3 included in the printer system 1 according to an embodiment of the present disclosure.

As illustrated in FIG. 8, the image forming apparatus 2 notifies the post-processing apparatus 3 of a startup trigger of the printer system 1. When the startup of the post-processing apparatus 3 is completed, the post-processing apparatus 3 notifies the image forming apparatus 2 of a startup completion trigger (step S801). With this notification, the startup of the printer system 1 is completed, then the setting process by a user, the image forming operation, and the post-processing operation are started.

After the above-described operations are performed, a sheet reception control trigger is notified from the image forming apparatus 2 to the post-processing apparatus 3 when the sheet P is ejected from the image forming apparatus 2 to the post-processing apparatus 3 (step S802). After receiving the sheet reception control trigger from the image forming apparatus 2, the post-processing apparatus 3 conveys the sheet P from the image forming apparatus 2, to the inner sheet tray 22, and starts the set binding operation. For example, after the sheet P is conveyed to the inner sheet tray 22, unevenness of the end of the sheet P in the main scanning direction is aligned by the side fences 24, i.e., the left side fence 24L and the right side fence 24R.

The image forming apparatus 2 compares the total number of received sheets with the maximum bindable number of sheets after confirmation of receipt of the last sheet. When the total number of received sheets exceeds the maximum bindable number of sheets, an overloaded sheet number control trigger is notified to the post-processing apparatus 3 in accordance with the binding operation set in advance (step S803).

For example, after the last sheet is received by the inner sheet tray 22, the post-processing apparatus 3 executes the overloaded sheet control process. After the whole image forming operations and the sheet ejecting operation to the post-processing apparatus 3 have been completed, the post-processing apparatus 3 performs the changeover of the binder if the changeover is needed. After the inner sheet tray 22 has received the last sheet conveyed from the image forming apparatus 2 and ejected to the post-processing apparatus 3, whether to perform the changeover of the binder is determined, and the changeover of the binder is performed based on the determination. By so doing, a reduction in time to reheat a heater or heaters (enhancement in the productivity) and a reduction in electricity to reheat the heater or the heaters are achieved, resulting in contribution to an energy-saving effect.

In the sequence chart of FIG. 8, the overloaded sheet number control trigger is notified from the image forming apparatus 2. However, the overloaded sheet number control trigger may not be notified from the image forming apparatus 2 and the number of sheets P may be determined by the post-processing apparatus 3. Further, the timing to notify the overloaded sheet number control trigger is not limited to the timing described in the sequence chart in FIG. 8.

Second Embodiment of Printer System 1

A description is given of the printer system 1 as an image forming system according to a second embodiment of the present disclosure.

As the command sequence in the second embodiment is substantially the same as the command sequence in the first embodiment, the command sequence is not illustrated again, and the following description is given with reference to FIG. 8.

The image forming apparatus 2 according to the present embodiment compares the total number of sheets P with the maximum number of sheets available to be bound each time the sheet P is ejected to the post-processing apparatus 3 and determines whether the total number of sheets P exceeds the maximum bindable number of sheets (step S803). When the total number of sheets P exceeds the maximum bindable number of sheets, the overloaded sheet number control trigger is notified from the image forming apparatus 2 to the post-processing apparatus 3 without waiting for the ejection of the last sheet of the sheets P, and the post-processing apparatus 3 starts the changeover of the binder for switching the binding operation.

After receiving the overloaded sheet number control trigger, the post-processing apparatus 3 performs the changeover of the binder from the first binder 25 to the second binder 55. At this time, the post-processing apparatus 3 moves the sheets P in the reverse direction (i.e., the sheet ejection direction of the inner sheet tray 22) that is opposite to the sheet conveyance direction, as described below. In this case, the post-processing apparatus 3 can move the sheets P stacked on the inner sheet tray 22 without waiting for arrival of the last sheet to the inner sheet tray 22. When compared with a case of moving the large number of stacked sheets P, a case of moving the small number of stacked sheets P results in less load (damage) on the sheets P and less variation in alignment of the sheets P.

For this reason, as compared to the configuration according to the first embodiment, the configuration according to the second embodiment allows the changeover of the binder when the number of sheets P stacked in the inner sheet tray 22 is relatively small. As a result, the load (damage) on the sheets P and the variation in alignment of the sheets P can be reduced.

As in the first embodiment, the number of sheets P in the second embodiment may be determined by the post-processing apparatus 3 without sending the overloaded sheet number control trigger from the image forming apparatus 2. In this case, the amount of communication from the image forming apparatus 2 to the post-processing apparatus 3 can be reduced, and the risk due to communication noise can be reduced. The timing of notifying the overloaded sheet number control trigger to the post-processing apparatus 3 is not limited to the timing described in the sequence flow in FIG. 8.

First Embodiment of Post-Processing Apparatus 3

A description is now given of the overloaded sheet control process executed by the post-processing apparatus 3 according to a first embodiment of the present disclosure.

Figure 9:
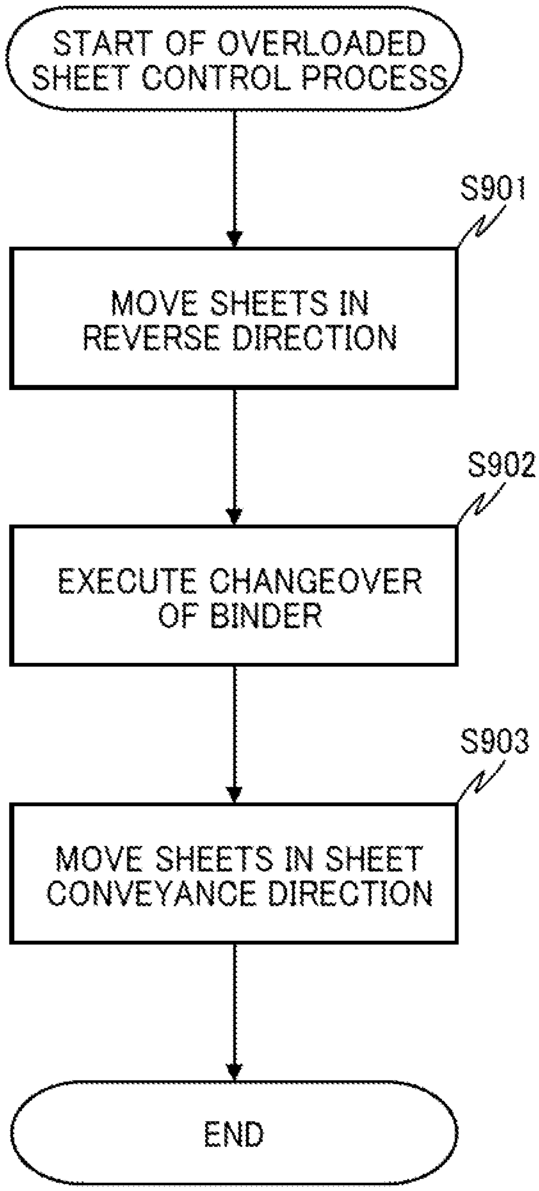
FIG. 9 is a flowchart of an overloaded sheet control process executed by the post-processing apparatus, according to a first embodiment of the present disclosure.

FIG. 9 is a flowchart of the overloaded sheet control process executed by the post-processing apparatus 3 after the post-processing apparatus 3 has received the overloaded sheet number control trigger in step S803.

Initially, the post-processing apparatus 3 causes a moving member serving as a feeder to move the sheet bundle of sheets P stacked in the inner sheet tray 22 in the reverse direction (i.e., the sheet ejection direction of the inner sheet tray 22) opposite to the sheet conveyance direction on the inner sheet tray 22 (step S901). This moving operation is referred to as a "sheet retracting operation". FIG. 3 illustrates the relative positions of the first binder 25 and the second binder 55 and the relative positions of the first binder 25 and the second binder 55 with respect to the sheets P stacked in the inner sheet tray 22, before step S901 is executed.

Figure 10:
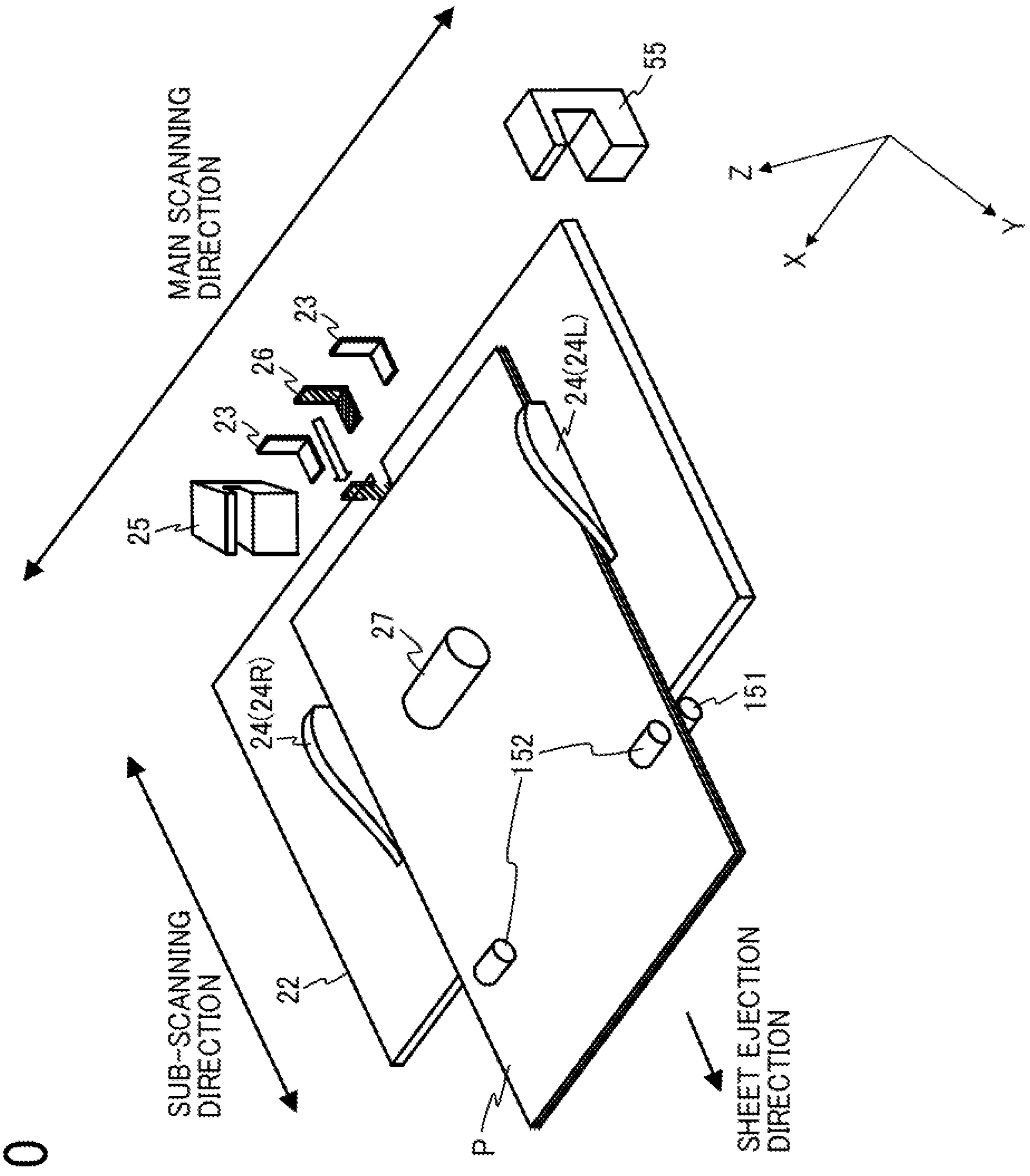
FIG. 10 is a diagram illustrating an operation of the binders in the overloaded sheet control process.

FIG. 10 is a diagram illustrating an operation of the binders in the overloaded sheet control process.

Specifically, FIG. 10 illustrates the relative positions of the first binder 25 and the second binder 55 and the relative positions of the first binder 25 and the second binder 55 with respect to the sheets P stacked in the inner sheet tray 22, after the sheet retracting operation is performed in step S901.

As illustrated in FIG. 10, the retraction claw 26 is moved in the reverse direction (i.e., the sheet ejection direction) opposite to the sheet conveyance direction to move the sheets P in the inner sheet tray 22 while the sheets P is stacked in the inner sheet tray 22. By so doing, the sheets P is moved to the position away from the end fences 23. At this time, the leading ends of the sheets P in the sheet conveyance direction are aligned by the end fences 23, and the retraction claw 26 moves the sheet bundle of the sheets P aligned by the end fences 23 in the direction away from the end fences 23.

Moreover, the distance of movement of the sheets P at this time is a distance in which the second binder 55 does not contact the sheets P even if the second binder 55 rotates at a position proximate to the position suitable for the binding type set by a user when the changeover of the binder from the first binder 25 to the second binder 55 is performed.

The sheet retracting operation is performed not only by moving the retraction claw 26 but also by rotating the drive roller 151 in the reverse direction (i.e., the sheet ejection direction) opposite to the sheet conveyance direction while the sheet bundle of the sheets P is nipped by the drive roller 151 and the driven roller 152. Moving the sheets P while the sheets P is nipped by the drive roller 151 and the driven roller 152 can reduce the out-of-alignment state of the end of the sheets P while moving the sheets P.

After the above-described operation, the post-processing apparatus 3 executes the changeover of the binder from the first binder 25 to the second binder 55 (step S902). In other words, the post-processing apparatus 3 executes the changeover of the binder in step S902 (i.e., the binder changeover).

Figure 11:
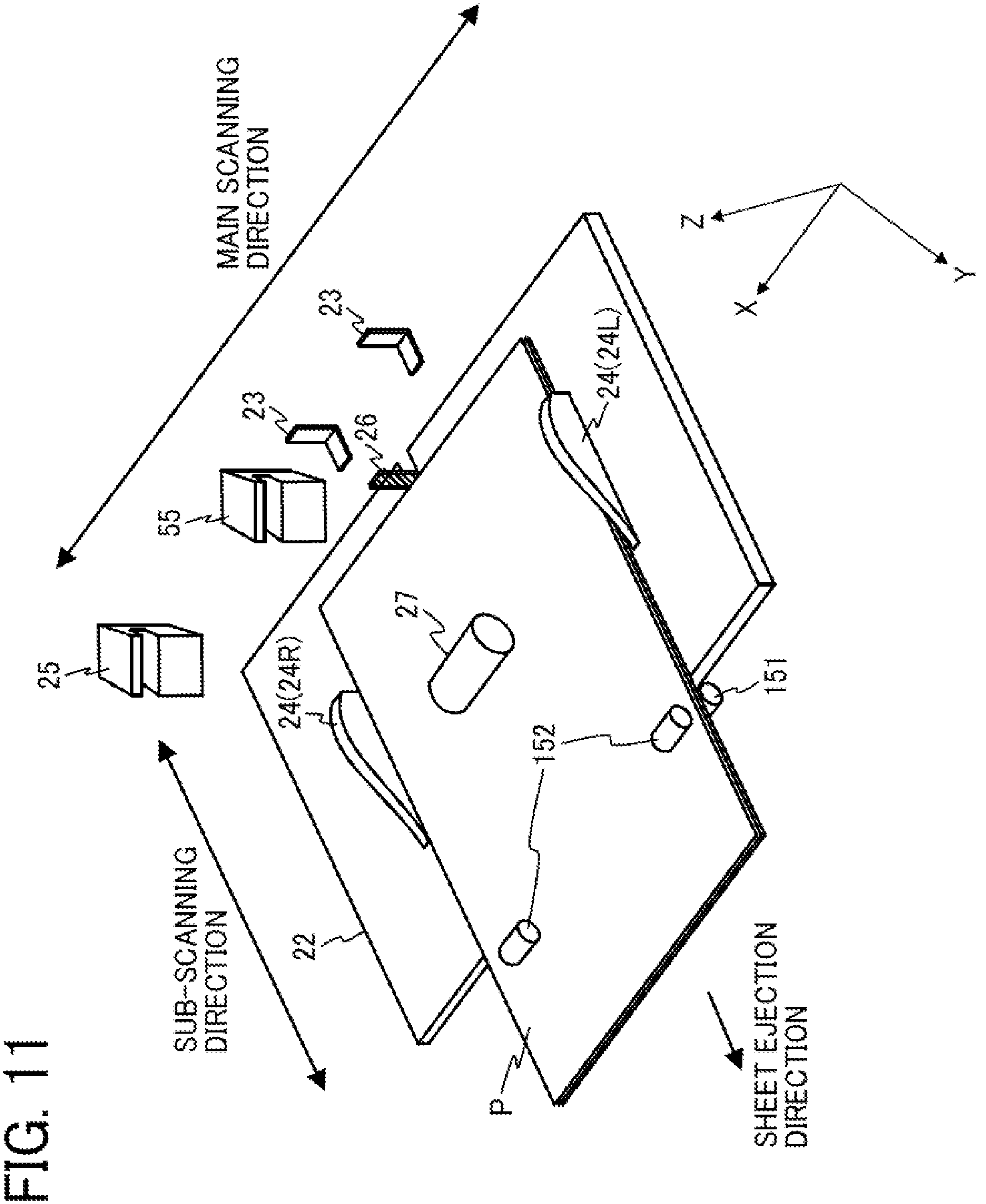
FIG. 11 is a diagram illustrating a subsequent operation of the binders in the overloaded sheet control process.

FIG. 11 is a diagram illustrating a subsequent operation of the binders in the overloaded sheet control process.

Specifically, FIG. 11 illustrates the relative positions of the first binder 25 and the second binder 55 and the relative positions of the first binder 25 and the second binder 55 with respect to the sheets P stacked in the inner sheet tray 22, when the binder changeover is executed.

Figure 12:
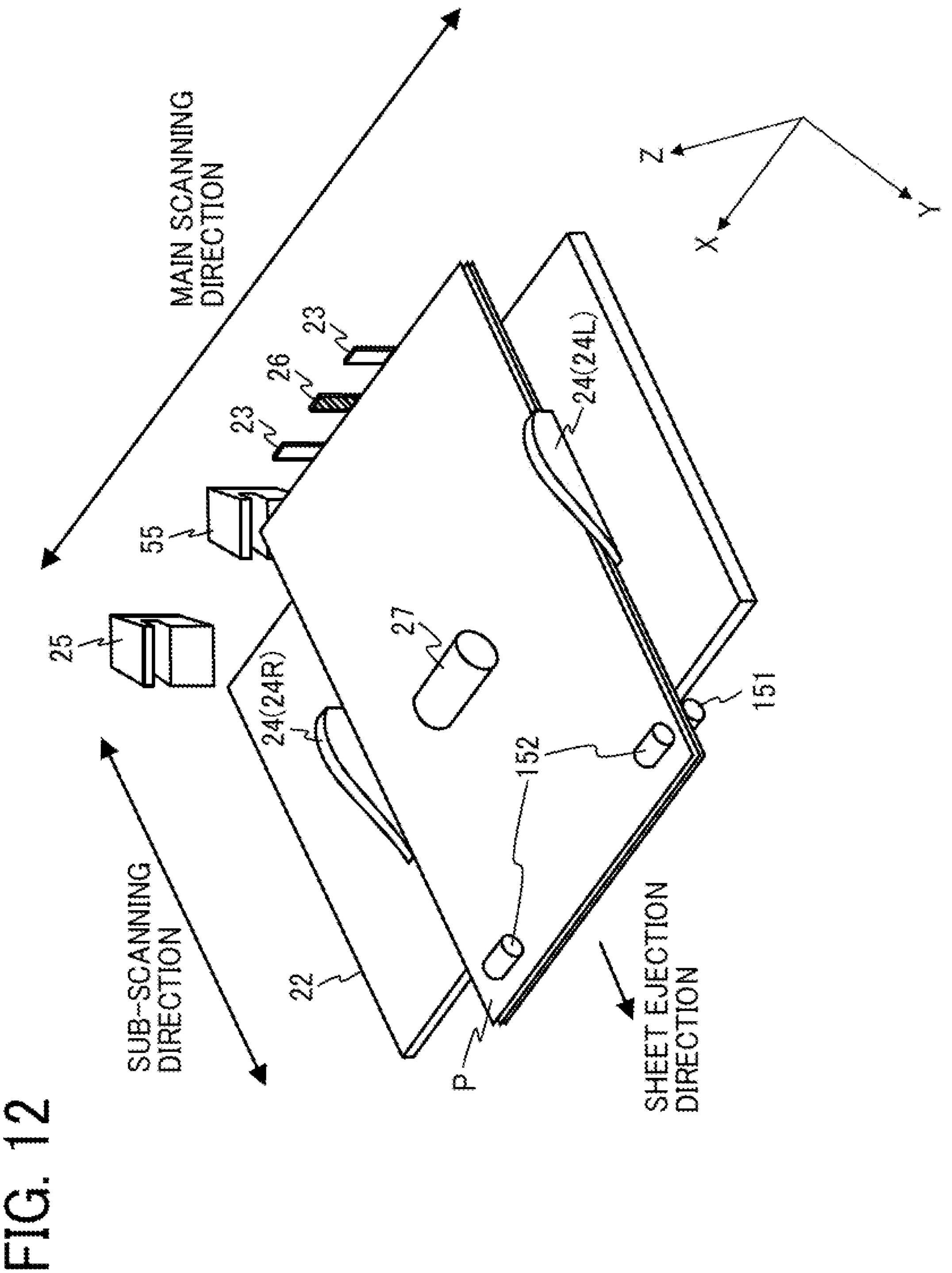
FIG. 12 is a diagram illustrating a subsequent operation of the binders in the overloaded sheet control process.

FIG. 12 is a diagram illustrating a subsequent operation of the binders in the overloaded sheet control process.

As illustrated in FIG. 11, the first binder 25 is moved to the initial position and the second binder 55 is moved to the position suitable for the binding type set by a user. Then, the second binder 55 changes the posture to be suitable for the binding type (i.e., the second binder 55 is rotated with respect to the sheets P) at the position proximate to the position suitable for the binding type.

Then, the post-processing apparatus 3 executes a sheet returning operation by which the sheets P are moved back to the position where the sheets P contact the end fences 23 from the position where the sheets P are retracted in the reverse direction (i.e., the sheet ejection direction) that is away from the end fences 23 by the sheet retracting operation (step S903). This sheet returning operation is performed by the rotations of the backward roller 27 that is in contact with the upper surface of the uppermost sheet of the sheets P stacked in the inner sheet tray 22, and the drive roller 151, and the driven roller 152. When the sheet returning operation is performed, the retraction claw 26 is returned from the position illustrated in FIG. 11 to the original position, i.e., the position illustrated in FIG. 12.

In the sheet returning operation (step S903), the sheets P are moved toward the end fences 23 by a distance equal to or longer than the distance moved in the sheet retracting operation (step S902). As a result, even when the sheets P are stacked unevenly due to slippage between the sheets P and the moving mechanism, the unevenness of the sheets P can be corrected to be aligned. The control of the distance of movement of the sheets Pin the sheet returning operation may be based on the driving amount of the motor that drives the drive roller 151. For example, when the motor for driving the drive roller 151 is a stepper motor, the amount of movement can be controlled by managing the number of pulses of the control pulse signal.

After the sheet returning operation, the post-processing apparatus 3 performs the stapling operation on the sheets P, then causes the retraction claw 26, the drive roller 151, and the driven roller 152 to eject the sheet bundle on which the binding operation has been performed, to the sheet and sheet bundle ejection tray 31.

As long as the procedures from step S901 to step S903 are included, the operation before step S901 and the operation after step S903 may be an operation other than the above-described operations.

As described above, the sheet retracting operation in the overloaded sheet control process can reduce the distance by which the first binder 25 is moved so that the second binder 55 does not contact the sheets P when the binder changeover is performed, as illustrated in FIGS. 10 to 12. In other words, as described with reference to FIGS. 5 to 7, as a space for switching the binders (i.e., a space obtained by the distance DY−the distance DX) does not need to be obtained, the post-processing apparatus 3 can be reduced in size.

In addition, as the distances of movement of the first binder 25 and the second binder 55 can be reduced, the time for the binder changeover can be reduced, and the productivity of sheet bundles can be enhanced.

Second Embodiment of Post-Processing Apparatus 3

Figure 13:
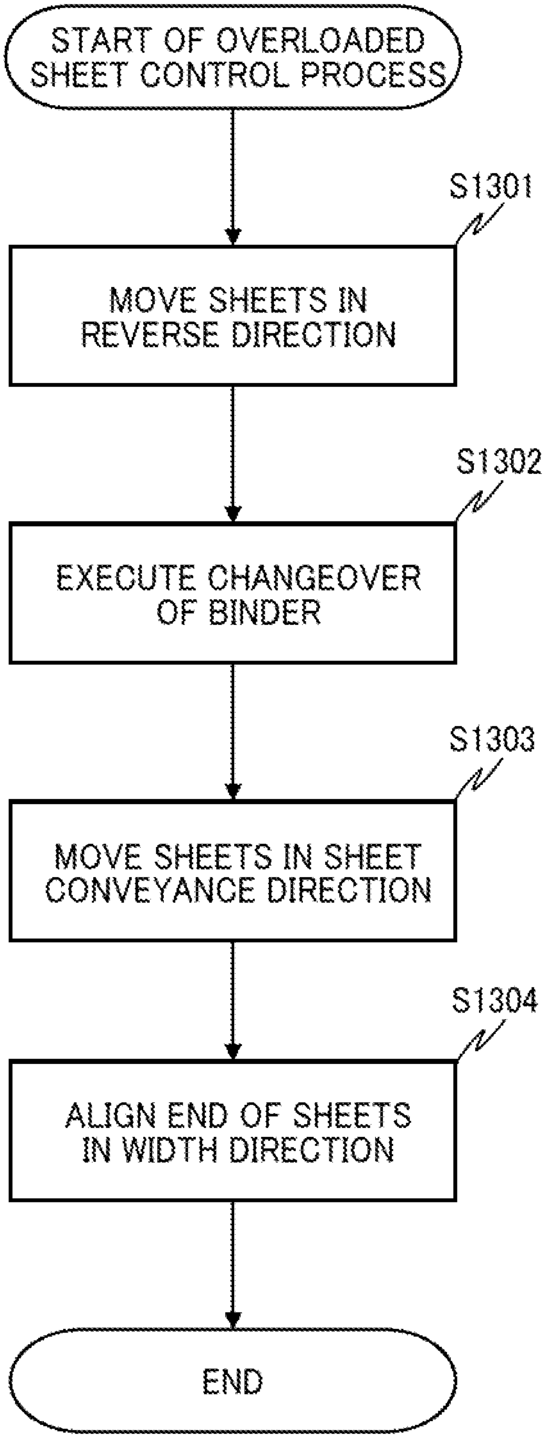
FIG. 13 is a flowchart of an overloaded sheet control process executed by the post-processing apparatus, according to a second embodiment of the present disclosure.

A description is now given of the overloaded sheet control process executed by the post-processing apparatus 3 according to a second embodiment of the present disclosure, with reference to a flowchart of FIG. 13.

FIG. 13 is a flowchart of an overloaded sheet control process executed by the post-processing apparatus 3, according to the second embodiment of the present disclosure.

This process in the flowchart of FIG. 13 is also an overloaded sheet control process executed by the post-processing apparatus 3 in response to a receipt of the overloaded sheet number control trigger in step S803 of the sequence chart of FIG. 8.

The sheet retracting operation (step S1301), the changeover of the binder (step S1302), and the sheet returning operation (step S1303) according to the present embodiment are similar to the sheet retracting operation (step S901), the changeover of the binder (step S902), and the sheet returning operation (step S903) according to the first embodiment, respectively. For this reason, the detailed description is omitted.

After completion of movement of the sheets P to the position where the sheets P contact the end fences 23 by the sheet returning operation (step S1303), the side fences 24, which are the left side fence 24L and the right side fence 24R, are moved to perform the sheet width end aligning operation to align the end of the sheets P in the width direction (step S1304).

Figure 14:
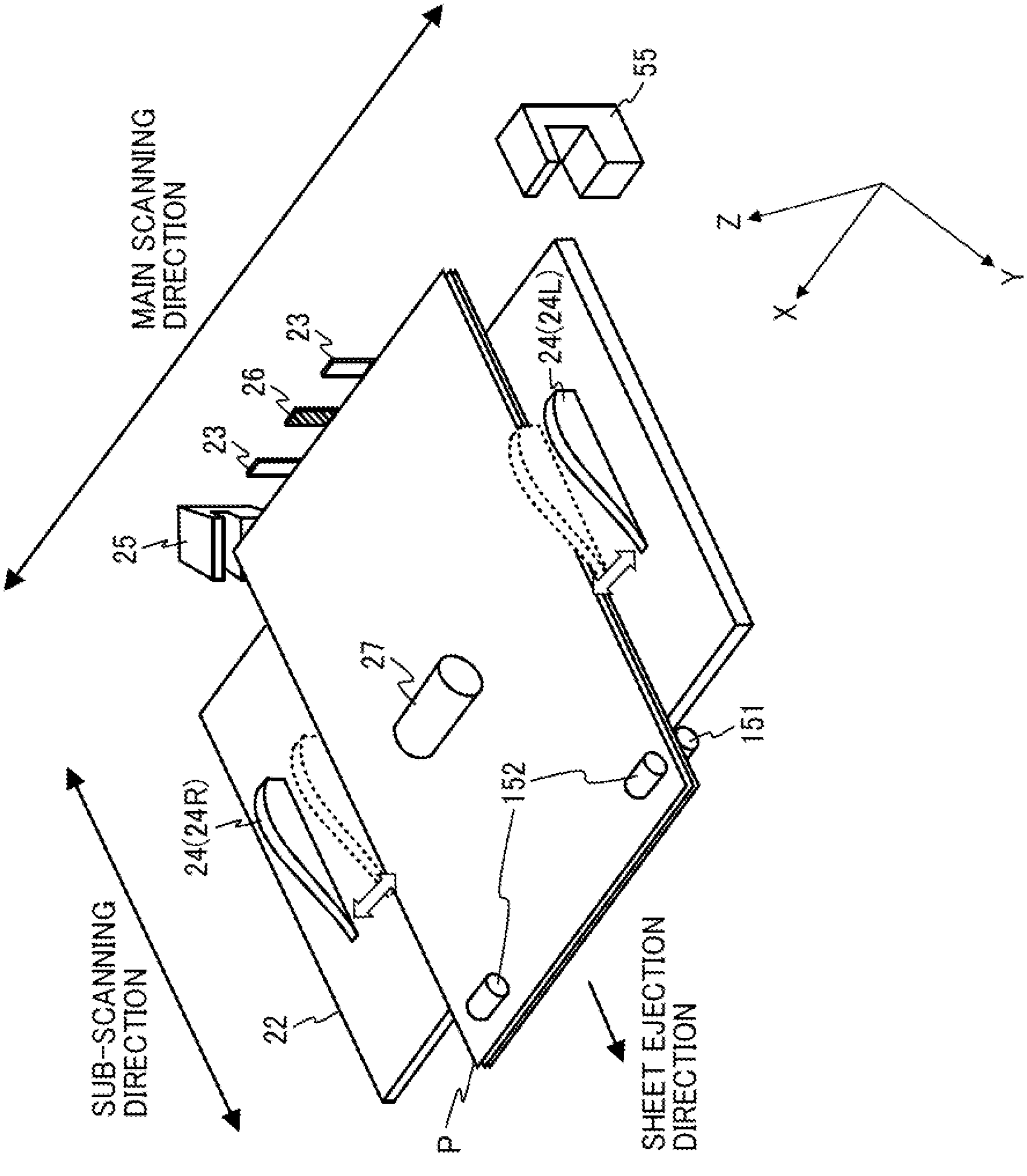
FIG. 14 is a diagram illustrating an operation of the binders in the overloaded sheet control process.

FIG. 14 is a diagram illustrating a binding operation performed in the overloaded sheet control process.

Specifically, FIG. 14 illustrates the relative positions of the pair of side fences 24 (i.e., the left side fence 24L and the right side fence 24R) with respect to the sheets P when the sheet width end aligning operation is performed.

As illustrated in FIG. 14, the pair of side fences 24 (i.e., the left side fence 24L and the right side fence 24R) are relatively moved toward the end of the sheets P or away from the end of the sheets P. By so doing, the sheets P that is moved back to the binding position can be realigned at the end in the width direction.

This realignment of the end of the sheets Pin the width direction after the sheets P is moved back to the binding position allows correction of unevenness of the sheets P in the main scanning direction even if the sheets P in the main scanning direction becomes uneven (not aligned) after the changeover along the moving back of the sheets P in the sheet ejection direction, in other words, in the reverse direction opposite to the sheet conveyance direction to the inner sheet tray 22.

Third Embodiment of Post-Processing Apparatus 3

Figure 15:
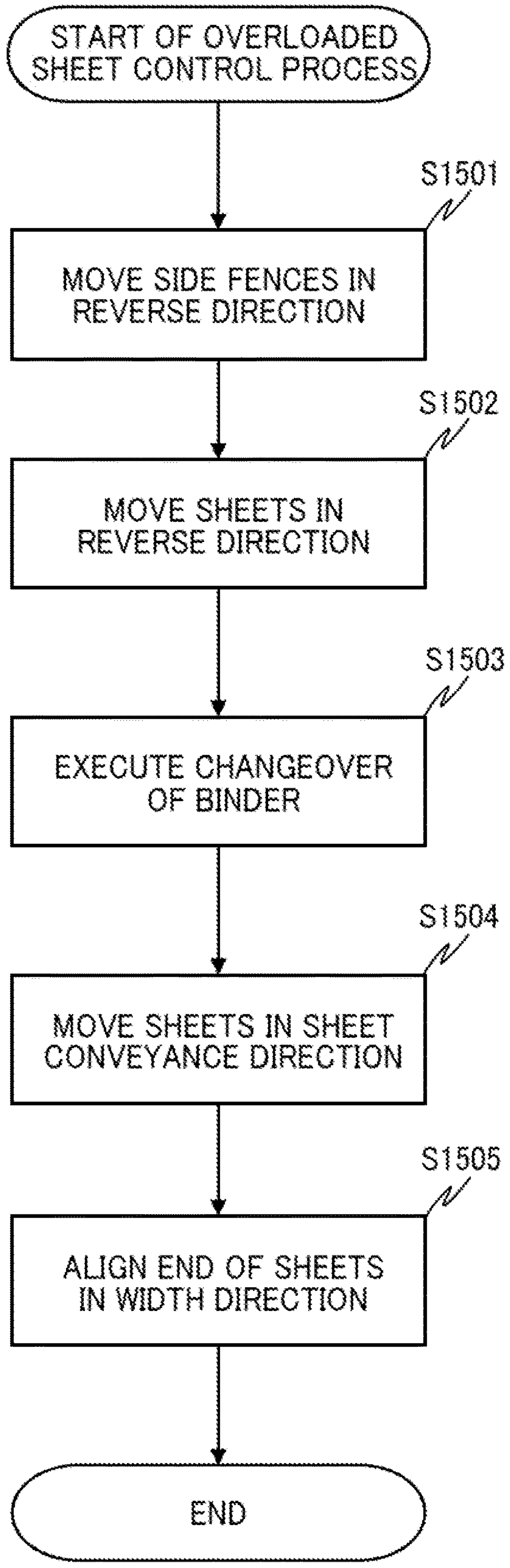
FIG. 15 is a flowchart of an overloaded sheet control process executed by the post-processing apparatus, according to a third embodiment of the present disclosure.

A description is now given of the overloaded sheet control process executed by the post-processing apparatus 3 according to a third embodiment of the present disclosure, with reference to a flowchart of FIG. 15.

FIG. 15 is a flowchart of an overloaded sheet control process as a third embodiment, executed by the post-processing apparatus 3.

This process in the flowchart of FIG. 15 is also an overloaded sheet control process executed by the post-processing apparatus 3 in response to a receipt of the overloaded sheet number control trigger in step S803 of the sequence chart of FIG. 8.

Initially, the post-processing apparatus 3 performs the side fence retracting operation on the side fences 24 to retract the side fences 24 from the position at which the side fences 24 are in contact with the end of the sheets P to the position away from the sheets P (step S1501).

Figure 16:
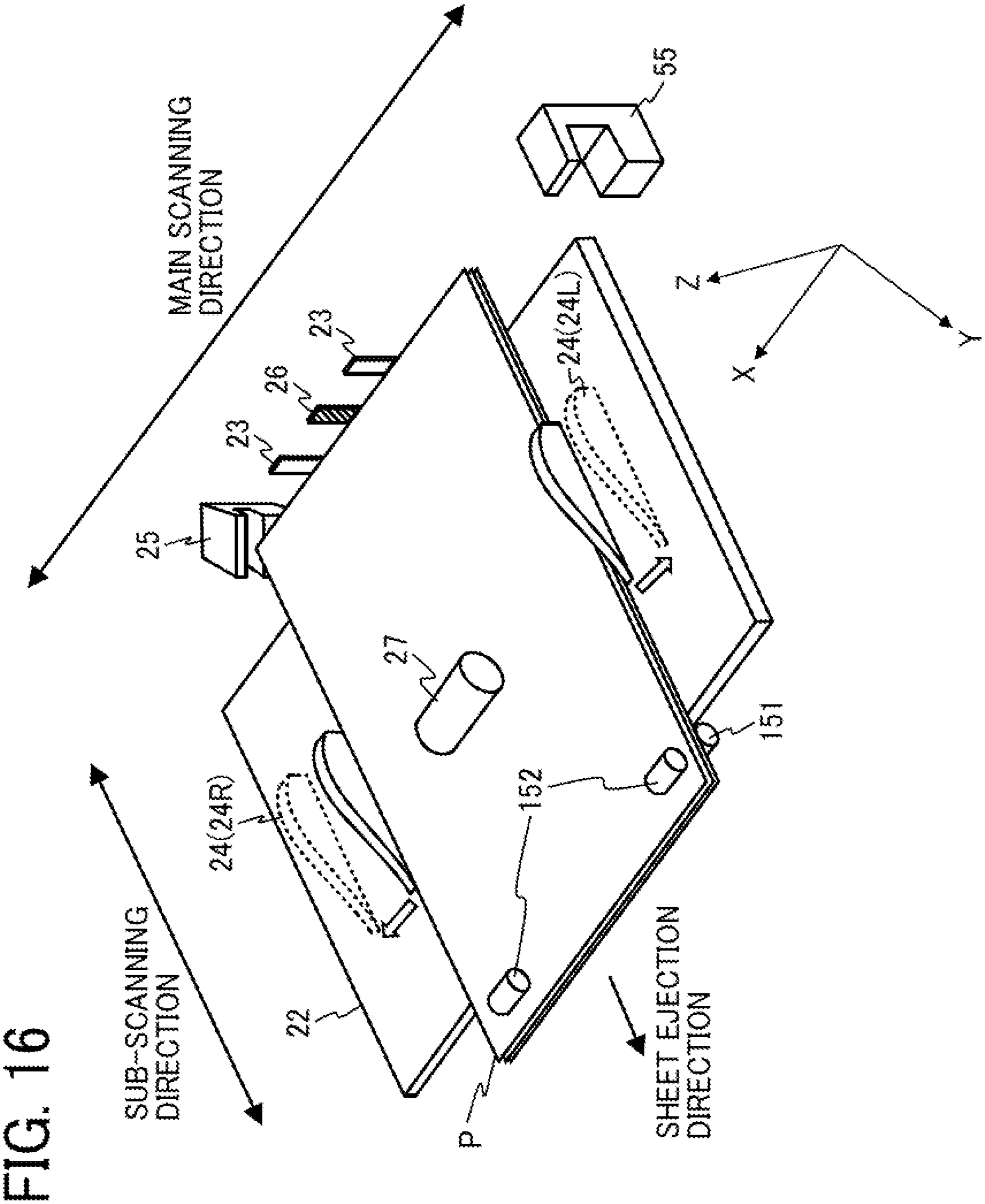
FIG. 16 is a diagram illustrating an operation of the binders in the overloaded sheet control process.

FIG. 16 is a diagram illustrating a binding operation performed in the overloaded sheet control process.

Specifically, FIG. 16 illustrates the relative positions of the side fences 24 (i.e., a pair of the left side fence 24L and the right side fence 24R) with respect to the sheets P when the side fence retracting operation is performed.

As illustrated in FIG. 16, after the sheets P conveyed to the inner sheet tray 22 are aligned at the end in the width direction by the pair of side fences 24, the side fences 24 (i.e., a pair of the left side fence 24L and the right side fence 24R) are moved to the position at which the pair of side fences 24 do not contact the sheets P before the binder changeover is performed. As described above, after the side fences 24 are moved away from the sheets P, the sheet retracting operation (step S1502) is performed, so that the sheet resistance can be reduced.

The sheet retracting operation (step S1502), the changeover of the binder (step S1503), the sheet returning operation (step S1504), and the sheet width aligning operation (step S1505) according to the present embodiment are similar to the sheet retracting operation (step S1301), the changeover of the binder (step S1302), the sheet returning operation (step S1303), and the sheet width aligning operation (step S1304) according to the second embodiment, respectively. For this reason, the detailed description is omitted.

Fourth Embodiment of Post-Processing Apparatus 3

A description is now given of the overloaded sheet control process executed by the post-processing apparatus 3 according to a fourth embodiment of the present disclosure.

In the sheet retracting operation (step S901) described in the first embodiment, the configuration used for the retracting operation of the sheets P may be switched based on information indicating the size of the sheets P stacked in the inner sheet tray 22.

For example, the retraction claw 26, the drive roller 151, and the driven roller 152 are used when the size of the sheet P is relatively small. On the other hand, the retraction claw 26, the drive roller 151, the driven roller 152, and the backward roller 27 are used when the size of the sheet P is relatively large.

By changing the sheet retracting operation in accordance with the size of the sheet P, the backward roller 27 is not used for the small-sized sheet P, so that the deterioration of the backward roller 27 can be reduced. In addition, in the case of a large-sized sheet P, unevenness of the end of the sheets P in sheet conveyance can be reduced by increasing the number of fulcrums for conveyance.

Further, the sheet retracting operation may be performed without using the retraction claw 26. In this case, the post-processing apparatus 3 may not include the retraction claw 26. Due to such a configuration, the number of parts and components can be reduced, and the manufacturing cost of the apparatus can be reduced.

Fifth Embodiment of Post-Processing Apparatus 3

A description is now given of the overloaded sheet control process executed by the post-processing apparatus 3 according to a fifth embodiment of the present disclosure.

In the sheet returning operation (step S903) described in the first embodiment, the configuration used for the sheet returning operation of the sheets P may be switched based on information indicating the size of the sheets P stacked in the inner sheet tray 22.

For example, the drive roller 151 and the driven roller 152 are used when the size of the sheet P is relatively small. On the other hand, the drive roller 151, the driven roller 152, and the backward roller 27 are used when the size of the sheet P is relatively large.

By changing the sheet retracting operation in accordance with the size of the sheet P, the backward roller 27 is not used for the small-sized sheet P, so that the deterioration of the backward roller 27 can be reduced. In addition, in the case of a large-sized sheet P, unevenness of the end of the sheets P in sheet conveyance can be reduced by increasing the number of fulcrums for conveyance.

Further, the sheet returning operation may be performed without the backward roller 27 regardless of the size. In this case, the post-processing apparatus 3 may not include the backward roller 27. Due to such a configuration, the number of parts and components can be reduced, and the manufacturing cost of the apparatus can be reduced.

Sixth Embodiment of Post-Processing Apparatus 3

Figure 17:
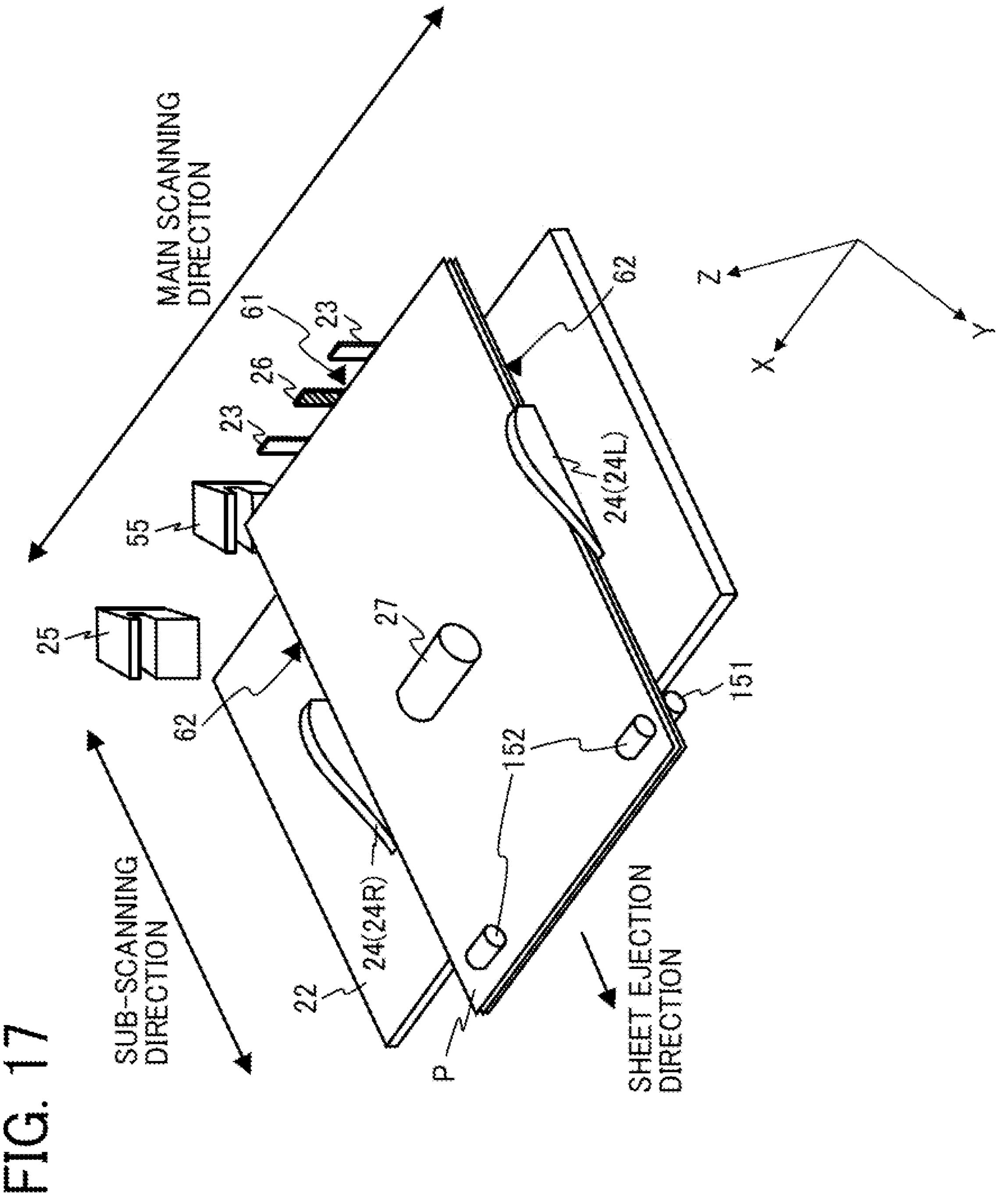
FIG. 17 is another perspective view of binders in the post-processing apparatus.

A description is given of a sixth embodiment of the post-processing apparatus 3, with reference to FIGS. 17 and 18.

FIG. 17 is a perspective view of the binders in the post-processing apparatus 3 as a second example.

As illustrated in FIG. 17, the post-processing apparatus 3 further includes a first sensor 61 on the inner sheet tray 22 at a position facing the end of the sheets P in the sheet conveyance direction on the inner sheet tray 22. The post-processing apparatus 3 further includes second sensors 62 as a pair of sensors on the inner sheet tray 22 at positions facing the respective ends of the sheets P in the width direction on the inner sheet tray 22.

FIG. 18 is a table of determination conditions in the second example of the binder of FIG. 17.

Specifically, FIG. 18 is a table of the relation of a state of the sheet P and a case where each of the first sensor 61 and the second sensors 62 detect the sheet P (ON) and does not detect the sheet P (OFF).

As illustrated in FIGS. 17 and 18, when the first sensor 61 is ON and the second sensors 62 are also ON, this table indicates that the sheet P is at the position where the sheets P come into contact with the end fences 23.

On the other hand, when the first sensor 61 is OFF and the second sensors 62 are OFF, this table indicates that the sheet P is retracted to the given position by the sheet retracting operation. In other words, the binder changeover (e.g., step S902) is performed in this state. In addition, when the post-processing apparatus 3 determines that the sheet P has moved to the given retraction position in the sheet retracting operation (e.g., step S901), a time from when the first sensor 61 is turned off to when the second sensors 62 are turned off may be determined in advance, and the determination may be made by measuring a time difference between ON and OFF of each sensor.

As the post-processing apparatus 3 includes the second sensors 62 on the inner sheet tray 22 at the positions facing the ends of the sheets P in the width direction on the inner sheet tray 22, the sheets P can be detected even when the sheets P are deformed, e.g., warped.

According to the embodiments of the post-processing apparatus 3 described above, the sheets P stacked in the inner sheet tray 22 are moved by a certain amount in the direction away from the end fences 23, so that the sheets P are retracted to a position where the sheets P do not interfere with the operation of either the first binder 25 or the second binder 55. This operation can reduce the distance of movement of the first binder 25 and the second binder 55 for the changeover of the binder from the first binder 25 to the second binder 55 for switching to the binding operation. As a result, a reduction in size and weight of the post-processing apparatus 3 can be achieved.

Further, when the time that the sheets P stored in the inner sheet tray 22 is moved in a direction away from the end fences 23 by a certain amount (distance) and the time that the first binder 25 and the second binder 55 are moved to the positions at which the first binder 25 and the second binder 55 do not interfere with the sheets P are compared, the sheet retracting operation of the sheets P ends earlier. As a result, the productivity of the sheet bundles can be enhanced.

With respect to the post-processing apparatus 3, the timing at which the number of sheets stacked in the inner sheet tray 22 is compared with the maximum bindable number of sheets and the timing at which the sheet bundle is returned after the changeover of the binding operation from the first binder 25 to the second binder 55 are not limited to the embodiments of the post-processing apparatus 3 described above. In the changeover from the first binder to the second binder 55 for switching the binding operation, the timing may be appropriately selected as long as the sheet bundle does not interfere with the first binder 25 and the second binder 55 and the changeover in the post-processing apparatus 3 is completed earlier than the changeover in a typical post-processing apparatus.

The control performed by the post-processing apparatus 3 according to the above-described embodiments is implemented by the hardware resources of a computer in cooperation with programs as computer software. In other words, the control process may be a control method executed by a computer causing an arithmetic device, a storage device, an input device, an output device, and a control device to operate in cooperation with each other based on a program. In addition, the program may be written in, for example, a storage device or a storage medium and distributed, or may be distributed through, for example, an electric communication line.

Embodiments of the present disclosure are not limited to the above-described embodiments, and numerous additional modifications and variations are possible in light of the teachings within the technical scope of the appended claims. It is therefore to be understood that, the disclosure of the present specification may be practiced otherwise by those skilled in the art than as specifically described herein. Such embodiments and variations thereof are included in the scope and gist of the embodiments of the present disclosure and are included in the embodiments described in claims and the equivalent scope thereof.

Aspects of the Present Disclosure

A description is given of some aspects of the present disclosure.

Aspect 1

In Aspect 1, a sheet processing apparatus includes a tray, a first binder, a second binder, a feeder, and circuitry. The tray receives and stores multiple sheet media as a sheet bundle. The first binder presses the sheet bundle to bind the sheet bundle at a binding position. The second binder penetrates the sheet bundle with a needle to bind the sheet bundle at the binding position. The feeder feeds the sheet bundle in a first direction toward the first binder and the second binder, and move the sheet bundle in a second direction opposite to the first direction. The circuitry is to cause the feeder to move the sheet bundle on the tray in the second direction, move the first binder from the binding position to a home position different from the binding position in a width direction orthogonal to the first direction and the second direction, and move the second binder to the binding position in the width direction to bind the sheet bundle by the second binder after the sheet bundle is moved in the second direction and the first binder is moved to the home position.

Aspect 2

In Aspect 2, according to Aspect 1, the circuitry is to cause the feeder to move the sheet bundle in the first direction after the second binder is moved to the binding position.

Aspect 3

In Aspect 3, the sheet processing apparatus according to Aspect 2 further includes a side fence on the tray. The circuitry is further to cause the side fence to align side ends of the sheet bundle in the width direction after the feeder moves the sheet bundle in the first direction.

Aspect 4

In Aspect 4, according to Aspect 2 or 3, the feeder moves the sheet bundle in the first direction for a first distance after the second binder moves to the binding position, and the first distance is equal to or longer than a second distance of the sheet bundle moved by the feeder in the second direction to move the second binder to the binding position.

Aspect 5

In Aspect 5, according to any one of Aspects 1 to 4, the feeder includes, as moving members, at least one of a retractor at a downstream end of the tray in the first direction, the retractor movable in the first direction and the second direction, a conveyance roller pair at an upstream end of the tray in the first direction to nip the sheet bundle, or a roller in contact with a top surface of the sheet bundle on the tray, the roller rotatable to move the sheet bundle in the first direction and the second direction.

Aspect 6

In Aspect 6, according to Aspect 5, the circuitry is to cause the feeder to change the number of the moving members used to move the sheet bundle in accordance with a size or a thickness of each medium of the multiple sheet media on the tray.

Aspect 7

In Aspect 7, according to Aspect 5 or 6, the circuitry is to cause the retractor to move the sheet bundle in the second direction, move the second binder to the binding position in the width direction, cause the conveyance roller pair and the roller to move the sheet bundle, retracted in the second direction by the retractor, in the first direction, cause the second binder to bind the sheet bundle after the sheet bundle is moved in the second direction and the first binder is moved to the home position, and cause the retractor and the conveyance roller pair to eject the sheet bundle in the second direction.

Aspect 8

In Aspect 8, according to any one of Aspects 1 to 7, the feeder moves the sheet bundle in the second direction for the second distance to provide enough space for the second binder to move to the binding position in the width direction.

Aspect 9

In Aspect 9, according to any one of Aspects 1 to 8, the circuitry is to move the first binder to the home position, and move the second binder to a position proximate to the binding position to rotate the second binder.

Aspect 10

In Aspect 10, an image forming system includes the sheet processing apparatus according to any one of Aspects 1 to 9, and an image forming apparatus to form an image on each medium of the multiple sheet media. The sheet processing apparatus binds the sheet bundle on which the image is formed by the image forming apparatus.

Aspect 11

In Aspect 11, in the sheet processing apparatus according to Aspect 1, the circuitry is further to determine whether a number of the multiple sheet media on the tray is greater than a maximum number of the multiple sheet media bindable by the first binder, and cause the second binder to bind the sheet bundle instead of the first binder when the number exceeds the maximum number.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof. The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet processing apparatus comprising:

a tray to receive and store multiple sheet media as a sheet bundle;

a first binder to press the sheet bundle to bind the sheet bundle at a binding position;

a second binder to penetrate the sheet bundle with a needle to bind the sheet bundle at the binding position;

a feeder to:

feed the sheet bundle in a first direction toward the first binder and the second binder; and move the sheet bundle in a second direction opposite to the first direction; and circuitry configured to:

cause the feeder to move the sheet bundle on the tray in the second direction;

move the first binder from the binding position to a home position different from the binding position in a width direction orthogonal to the first direction and the second direction; and move the second binder to the binding position in the width direction to bind the sheet bundle by the second binder after the sheet bundle is moved in the second direction and the first binder is moved to the home position.

2. The sheet processing apparatus according to claim 1, wherein the circuitry is configured to cause the feeder to move the sheet bundle in the first direction after the second binder is moved to the binding position.

3. The sheet processing apparatus according to claim 2, further comprising a side fence on the tray, wherein the circuitry is further configured to cause the side fence to align side ends of the sheet bundle in the width direction after the feeder moves the sheet bundle in the first direction.

4. The sheet processing apparatus according to claim 2, wherein the feeder moves the sheet bundle in the first direction for a first distance after the second binder moves to the binding position, and the first distance is equal to or longer than a second distance of the sheet bundle moved by the feeder in the second direction to move the second binder to the binding position.

5. The sheet processing apparatus according to claim 1, wherein the feeder includes, as moving members, at least one of:

a retractor at a downstream end of the tray in the first direction, the retractor movable in the first direction and the second direction;

a conveyance roller pair at an upstream end of the tray in the first direction to nip the sheet bundle; or a roller in contact with a top surface of the sheet bundle on the tray, the roller rotatable to move the sheet bundle in the first direction and the second direction.

6. The sheet processing apparatus according to claim 5, wherein the circuitry is configured to cause the feeder to change a number of the moving members to move the sheet bundle in accordance with a size or a thickness of each medium of the multiple sheet media on the tray.

7. The sheet processing apparatus according to claim 5, wherein the circuitry is configured to:

cause the retractor to move the sheet bundle in the second direction;

move the second binder to the binding position in the width direction;

cause the conveyance roller pair and the roller to move the sheet bundle, retracted in the second direction by the retractor, in the first direction;

cause the second binder to bind the sheet bundle after the sheet bundle is moved in the second direction and the first binder is moved to the home position; and cause the retractor and the conveyance roller pair to eject the sheet bundle in the second direction.

8. The sheet processing apparatus according to claim 4, wherein the feeder moves the sheet bundle in the second direction for the second distance to provide enough space for the second binder to move to the binding position in the width direction.

9. The sheet processing apparatus according to claim 1, wherein the circuitry is configured to:

move the first binder to the home position; and move the second binder to a position proximate to the binding position to rotate the second binder.

10. An image forming system comprising:

the sheet processing apparatus according to claim 1; and an image forming apparatus to form an image on each medium of the multiple sheet media, wherein the sheet processing apparatus binds the sheet bundle on which the image is formed by the image forming apparatus.

11. The sheet processing apparatus according to claim 1, wherein the circuitry is further configured to:

determine whether a number of the multiple sheet media on the tray is greater than a maximum number of the multiple sheet media bindable by the first binder; and cause the second binder to bind the sheet bundle instead of the first binder when the number exceeds the maximum number.

* * * * *